US006372829B1

(12) United States Patent
Lamanna et al.

(10) Patent No.: US 6,372,829 B1
(45) Date of Patent: Apr. 16, 2002

(54) ANTISTATIC COMPOSITION

(75) Inventors: William M. Lamanna, Stillwater; Thomas P. Klun, Lakeland, both of MN (US); Kathleen A. Hachey, Hudson, WI (US); Alan D. Fanta, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/412,850

(22) Filed: Oct. 6, 1999

(51) Int. Cl.$^7$ ............................ C08K 5/34; H01M 6/14; C09K 11/04

(52) U.S. Cl. ....................... 524/99; 524/84; 524/85; 524/100; 429/194; 429/198; 429/46; 204/242; 252/622; 361/503; 361/504

(58) Field of Search .................. 429/194, 198, 429/46; 524/84, 95, 99, 106; 204/242; 252/622; 361/503, 504

(56) References Cited

U.S. PATENT DOCUMENTS

| | | | |
|---|---|---|---|
| 2,732,398 A | 1/1956 | Brice et al. ................. 260/503 |
| 3,476,753 A | 11/1969 | Hansen .................... 260/247.1 |
| 4,115,605 A | 9/1978 | Hultman et al. ............ 427/377 |
| 4,144,367 A | 3/1979 | Landucci ..................... 428/96 |
| 4,266,015 A | 5/1981 | Butler et al. ................ 430/527 |
| 4,313,978 A | 2/1982 | Stevens et al. ............. 427/384 |
| 4,335,201 A | 6/1982 | Miller et al. ................ 430/527 |
| 4,387,222 A | 6/1983 | Koshar ......................... 544/4 |
| 4,393,159 A | 7/1983 | Lybrand ..................... 524/243 |
| 4,439,505 A | 3/1984 | Perlstein et al. ............. 430/58 |
| 4,472,286 A | 9/1984 | Falk ............................. 252/3 |
| 4,478,922 A | 10/1984 | Perlstein et al. ............. 430/58 |
| 4,505,997 A | 3/1985 | Armand et al. ............. 429/192 |
| 4,582,781 A | 4/1986 | Chen et al. ................. 430/527 |
| 4,812,381 A | * 3/1989 | Bugner et al. .............. 430/110 |
| 4,831,098 A | 5/1989 | Watanabe et al. ............ 528/45 |
| 4,834,921 A | * 5/1989 | Eugner et al. .............. 470/110 |
| 4,847,187 A | 7/1989 | Ono et al. .................. 430/528 |
| 4,939,204 A | 7/1990 | Efford ........................ 524/701 |
| 4,975,363 A | 12/1990 | Cavallo et al. ............. 430/637 |
| 5,025,052 A | 6/1991 | Crater et al. ................ 524/104 |
| 5,043,195 A | 8/1991 | Skrivseth ................... 428/35.3 |
| 5,072,040 A | 12/1991 | Armand ..................... 564/82 |
| 5,099,026 A | 3/1992 | Crater et al. ................ 548/229 |
| 5,136,097 A | 8/1992 | Armand ...................... 568/28 |
| 5,145,727 A | 9/1992 | Potts et al. ................. 428/198 |
| 5,149,576 A | 9/1992 | Potts et al. ................. 428/198 |
| 5,176,943 A | 1/1993 | Woo .......................... 428/64 |
| 5,220,106 A | 6/1993 | Boate et al. ................ 585/865 |
| 5,273,840 A | 12/1993 | Dominey .................... 429/192 |
| 5,348,799 A | 9/1994 | Boston ....................... 428/323 |
| 5,502,251 A | 3/1996 | Pohmer et al. .............. 564/82 |
| 5,503,967 A | 4/1996 | Furlan et al. ............... 430/527 |
| 5,514,493 A | 5/1996 | Waddell et al. ............. 429/199 |
| 5,518,788 A | 5/1996 | Invie .......................... 428/65.1 |
| 5,554,664 A | 9/1996 | Lamanna et al. ............ 522/25 |
| 5,591,482 A | 1/1997 | He et al. .................... 427/244 |
| 5,626,957 A | 5/1997 | Benso et al. ................ 428/323 |
| 5,629,066 A | * 5/1997 | Yonemura et al. .......... 428/64.3 |
| 5,683,832 A | 11/1997 | Bonhote et al. ............. 429/111 |
| 5,723,664 A | 3/1998 | Sakaguchi et al. ............ 564/82 |
| 5,827,602 A | 10/1998 | Koch et al. ................. 429/194 |
| 5,874,616 A | 2/1999 | Howells et al. .............. 564/82 |

FOREIGN PATENT DOCUMENTS

| | | | |
|---|---|---|---|
| BE | 876.238 | 11/1979 | |
| EP | 0 047 903 B1 | 3/1982 | ............ C25B/3/02 |
| EP | 0 363 094 | 4/1990 | ......... C07C/211/62 |
| EP | 0 416 741 A1 | 3/1991 | .......... D06M/13/46 |
| EP | 0 663 612 A2 | 7/1995 | ............ G03C/1/85 |
| EP | 0 752 711 B1 | 1/1997 | ............ G21K/4/00 |
| EP | 0 873 986 | 10/1998 | ......... C07C/215/90 |
| EP | 0 897 950 A2 | 2/1999 | ............ C08K/5/50 |
| JP | 50-45055 | 4/1975 | ............ B05D/5/12 |
| JP | 53/15747 | 5/1978 | ............ C08J/7/04 |
| JP | 55-149938 | 11/1980 | ............ G03C/1/38 |
| JP | 60-221442 | 11/1985 | ............ C08K/5/17 |
| JP | 62-225517 | 10/1987 | ......... C08G/61/12 |
| JP | 63-71923 | 4/1988 | ............ G11B/5/66 |
| JP | 63-295667 | 12/1988 | ......... C08L/101/00 |
| JP | 63-308032 | 12/1988 | ......... C08G/61/12 |
| JP | 64-75534 | 3/1989 | ............ C08J/5/18 |
| JP | 5-289224 | 11/1993 | ............ G03C/1/30 |
| JP | 5-302077 | 11/1993 | ............ C09K/3/16 |
| JP | 6-18863 | 3/1994 | ......... C08G/61/12 |
| JP | 6-103228 | 4/1994 | .......... G06F/13/36 |
| JP | 8-92450 | 4/1996 | ......... C08L/27/06 |
| JP | 8-208889 | 8/1996 | ............ C08L/9/02 |
| JP | 9-255939 | 9/1997 | ............ C09K/3/16 |
| JP | 10-265674 | 10/1998 | ......... C08L/101/00 |
| JP | 11-116752 | 4/1999 | ......... C08L/27/06 |
| JP | 2909735 | 6/1999 | ............ C09K/3/16 |
| SU | 406849 | 8/1974 | ......... C08F/29/00 |
| SU | 427962 | 6/1975 | ......... C08F/47/22 |
| SU | 446522 | 7/1975 | ......... C08F/47/22 |

(List continued on next page.)

OTHER PUBLICATIONS

Koshar et al., "Bis(perfluoroalkylsulfonyl)methanes and Related Disulfones," J. Org. Chem., vol. 38, No. 19, pp. 3358–3363 (1973).

Wente et al., "Manufacture of Superfine Organic Fibers," Naval Research Laboratories Report 4364 (1954).

Wente, "Superfine Thermoplastic Fibers," Industrial and Engineering Chemistry, vol. 48, No. 8, pp. 1342–1346 (1956).

Primary Examiner—Kriellion A. Sanders
(74) Attorney, Agent, or Firm—Lucy C. Weiss

(57) ABSTRACT

An antistatic composition comprises (a) at least one ionic salt consisting of a nonpolymeric nitrogen onium cation and a weakly coordinating fluoroorganic anion, the conjugate acid of the anion being a superacid; and (b) at least one thermoplastic polymer. The composition exhibits good antistatic performance over a wide range of humidity levels.

39 Claims, No Drawings

FOREIGN PATENT DOCUMENTS

| | | | | |
|---|---|---|---|---|
| SU | 448199 | 10/1975 | ........... | C08F/47/22 |
| SU | 854949 | 8/1981 | .............. | C08J/7/06 |
| SU | 749081 | 12/1983 | ............ | C09K/3/16 |
| SU | 749084 | 12/1983 | ............ | C09K/3/16 |
| WO | WO 84/02798 | 7/1984 | ........... | G11B/23/04 |
| WO | WO 95/21872 | 8/1985 | ............. | C08F/4/52 |
| WO | WO 90/05129 | 5/1990 | ......... | C07C/215/40 |
| WO | WO 96/24929 | 8/1996 | ............ | G11B/7/24 |
| WO | WO 98/06106 | 2/1998 | ............. | G21F/9/28 |
| WO | WO 99/02611 | 1/1999 | ............ | C09D/5/00 |

* cited by examiner

ANTISTATIC COMPOSITION

FIELD OF THE INVENTION

This invention relates to compositions comprising at least one polymer and at least one antistatic agent. This invention further relates to fibers, films, fabrics, coatings, and molded or blown articles comprising the compositions. In other aspects, this invention also relates to novel compounds that are useful as antistatic agents and to processes for imparting antistatic characteristics to substrates.

BACKGROUND OF THE INVENTION

Electrostatic charge buildup is responsible for a variety of problems in the processing and use of many industrial products and materials. Electrostatic charging can cause materials to stick together or to repel one another. This is a particular problem in fiber and textile processing. In addition, static charge buildup can cause objects to attract dirt and dust, which can lead to fabrication or soiling problems and can impair product performance.

Sudden electrostatic discharges from insulating objects can also be a serious problem. With photographic film, such discharges can cause fogging and the appearance of artifacts. When flammable materials are present, a static electric discharge can serve as an ignition source, resulting in fires and/or explosions.

Static is a particular problem in the electronics industry, since modern electronic devices are extremely susceptible to permanent damage by static electric discharges. The buildup of static charge on insulating objects is especially common and problematic under conditions of low humidity and when liquids or solids move in contact with one another (tribocharging).

Static charge buildup can be controlled by increasing the electrical conductivity of a material. This can be accomplished by increasing ionic or electronic conductivity. The most common means of controlling static accumulation today is by increasing electrical conductivity through moisture adsorption. This is commonly achieved by adding moisture to the surrounding air (humidification) or by use of hygroscopic antistatic agents, which are generally referred to as humectants since they rely on the adsorption of atmospheric moisture for their effectiveness. Most antistatic agents operate by dissipating static charge as it builds up; thus, static decay rate and surface conductivity are common measures of the effectiveness of antistatic agents.

Antistatic agents can be applied to the surface (external antistat) or incorporated into the bulk (internal antistat) of an otherwise insulating material. Internal antistats are commonly employed in polymers such as plastics. Generally, internal antistats are mixed directly into a molten polymer during melt processing. (Typical polymer melt processing techniques include molding, melt blowing, melt spinning, and melt extrusion.) Relatively few antistatic agents have the requisite thermal stability to withstand polymer melt processing temperatures, which can be as high as 250 to 400° C. or more. Since static buildup is typically a surface phenomenon, internal antistats that are capable of migrating to and enriching the surface of a material are generally most effective.

Known antistatic agents cover a broad range of chemical classes, including organic amines and amides, esters of fatty acids, organic acids, polyoxyethylene derivatives, polyhydridic alcohols, metals, carbon black, semiconductors, and various organic and inorganic salts. Many are also surfactants and can be neutral or ionic in nature.

Many low molecular weight, neutral antistats have sufficiently high vapor pressures that they are unsuitable for use at high temperatures, as in polymer melt processing, due to material losses that occur via evaporation. Many other neutral antistats have insufficient thermal stability to survive polymer melt processing or other high temperature processing conditions.

Most nonmetallic antistats are humectants that rely on the adsorption and conductivity of water for charge dissipation. Thus, their effectiveness is typically diminished at low atmospheric humidity. Since many of these antistatic agents are also water soluble, they are easily removed by exposure of the material to water (as in washing) and are therefore not very durable. Water associated with hygroscopic antistatic agents can be a particular problem during polymer melt processing, since the water tends to vaporize rapidly at melt processing temperatures. This leads to the undesirable formation of bubbles in the polymer and can cause screw slippage in extrusion equipment.

Quaternary ammonium salts are well known in the art to be useful antistatic agents. They can be solid or liquid, the most common being halide or methanesulfonate salts. The salts provide excellent antistatic performance but suffer from limited thermal stability and are generally hygroscopic. Thus, they are not capable of withstanding the high temperature processing conditions required for many high performance thermoplastic resins.

Metal salts of inorganic, organic, and fluoroorganic anions have also shown proven utility as antistatic agents in certain polymer compositions. Alkali metal salts are most commonly employed, due to cost and toxicity considerations and to the high affinity of alkali metal cations, especially lithium, for water. However, most metal salts provide insufficient thermal stability under high temperature processing conditions and are not compatible with polymers of moderate to low polarity, such as polypropylene, polyester, and polycarbonate. This incompatibility can result in inadequate antistat performance and/or an unacceptable reduction in physical properties or transparency in a finished polymeric article. Consequently, the utility of metal salts as internal antistatic agents is generally limited to highly polar and/or hydrophilic polymer matrices cast from aqueous or organic solution at relatively low temperatures.

Furthermore, since many metal salts are corrosive towards metals and electronic components, they are unsuitable for applications where they may come into contact with such surfaces. Known hydrophilic metal salts and quaternary ammonium salts generally suffer all the disadvantages of other humectant antistatic agents (vide supra).

Thus, there remains a need in the art for antistatic agents that exhibit a superior balance of high thermal stability, hydrophobicity, low volatility, low corrosivity toward metals and electronic components, durability, and polymer compatibility, and that can impart good antistatic performance to a variety of insulating materials over a wide range of humidity levels.

SUMMARY OF THE INVENTION

Briefly, in one aspect, this invention provides an antistatic composition comprising or consisting essentially of a melt blend of (a) at least one ionic salt consisting of a nonpolymeric nitrogen onium cation (for example, a quaternary ammonium ion) and a weakly coordinating fluoroorganic anion, the conjugate acid of the anion being a superacid (for example, a bis(perfluoroalkanesulfonyl)imide ion); and (b) at least one thermoplastic polymer. As used herein, the term "melt blend" means a blend that has been prepared by melt processing technique(s), and the term "onium" means a positively charged ion having at least part of its charge localized on at least one nitrogen atom. Preferably, the Hammett acidity function, $H_o$, of the conjugate acid of the anion is less than about −10.

It has been discovered that the above-described ionic salts can be used as additives (internal antistats) or topical treatments (external antistats) to impart antistatic characteristics to polymers or other insulating materials. These ionic salts are surprisingly effective at dissipating the static charge that can accumulate in an otherwise insulating substrate such as a polymer film or fabric. For example, when incorporated as polymer melt additive in polypropylene melt-blown nonwoven fabric, certain preferred salts impart static dissipation rates that are as good or better than those of any known antistatic agents under the same static decay test conditions. The ionic salts used in the composition of the invention are effective, even without the presence of a conductivity enhancing additive (for example, a lithium salt or a polar organic solvent), and thus compositions consisting essentially of salt and insulating material surprisingly exhibit good antistatic characteristics.

In addition, the ionic salts used in the composition of the invention exhibit surprisingly high thermal stabilities. The salts (surprisingly, even the quaternary ammonium salts) remain stable at temperatures up to 300–500° C. (often, and preferably, at temperatures greater than 350° C.) and thus are particularly well-suited for use as polymer melt additives (incorporated in host polymer through high temperature melt processing) and in applications where the use temperatures are very high. The salts are also nonvolatile (having essentially no vapor pressure), nonflammable, and can be utilized under normal processing and use conditions without the emission of potentially harmful vapors and without the gradual declines in antistat performance that result from evaporative loss.

The ionic salts used in the composition of the invention are compatible with a variety of polymers. Many of the salts are also hydrophobic (immiscible with water), and thus their antistatic performance is relatively independent of atmospheric humidity levels and durable even under exposure to aqueous environments. Preferred ionic salts are liquid at room temperature (for example, at about 25° C.) and above.

The ionic salts used in the composition of the invention therefore meet the need in the art for antistatic agents that exhibit a superior balance of high thermal stability, hydrophobicity, low volatility, durability, and polymer compatibility, while imparting good antistatic performance to a variety of insulating materials over a wide range of humidity levels.

In other aspects, this invention also provides fiber, fabric, film, a coating, and a molded or blown article comprising the composition of the invention; novel compounds useful as antistatic agents; and processes for imparting antistatic characteristics to a substrate, for example, by bulk addition or by topical treatment.

DETAILED DESCRIPTION OF THE INVENTION

Ionic salts suitable for use in the antistatic composition of the invention are those that consist of a nonpolymeric nitrogen onium cation and a weakly coordinating fluoroorganic (either fully fluorinated, that is perfluorinated, or partially fluorinated) anion. The nitrogen onium cation can be cyclic (that is, where the nitrogen atom(s) of the cation are ring atoms) or acyclic (that is, where the nitrogen atom(s) of the cation are not ring atoms but can have cyclic substituents). The cyclic cations can be aromatic, unsaturated but nonaromatic, or saturated, and the acyclic cations can be saturated or unsaturated.

The cyclic cations can contain one or more ring heteroatoms other than nitrogen (for example, oxygen or sulfur), and the ring atoms can bear substituents (for example, hydrogen, halogen, or organic groups such as alkyl, alicyclic, aryl, alkalicyclic, alkaryl, alicyclicalkyl, aralkyl, aralicyclic, and alicyclicaryl groups). Separate alkyl substituents can be joined together to constitute a unitary alkylene radical of from 2 to 4 carbon atoms forming a ring structure converging on nitrogen. Organic substituents can contain one or more heteroatoms such as, for example, nitrogen, oxygen, sulfur, phosphorus, or halogen (and thus can be fluoroorganic in nature).

The acyclic cations can have at least one (preferably, at least two; more preferably, at least three; most preferably, four) nitrogen-bonded organic substituents or R groups, with the remaining substituents being hydrogen. The R groups can be cyclic or acyclic, saturated or unsaturated, aromatic or nonaromatic, and can contain one or more heteroatoms such as, for example, nitrogen, oxygen, sulfur, phosphorus, or halogen (and thus can be fluoroorganic in nature).

Preferably, the nitrogen onium cation is acyclic, saturated cyclic, or aromatic. More preferably, the cation is acyclic or aromatic. Most preferably, the cation is aromatic for stability reasons.

Preferred acyclic nitrogen onium cations are quaternary or tertiary (most preferably, quaternary) ammonium ions. The quaternary and tertiary ammonium ions are preferably of low symmetry (having at least two, preferably at least three, different nitrogen-bonded organic substituents or R groups as defined above) and more preferably contain at least one hydroxyl group in at least one nitrogen-bonded organic substituent. Most preferred acyclic nitrogen onium cations are those described below for the ionic salts of Formula I.

Preferred aromatic nitrogen onium cations are those selected from the group consisting of

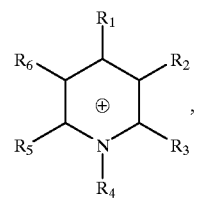

Pyridinium

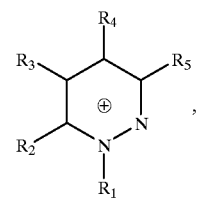

Pyridazinium

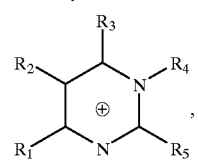

Pyrimidinium

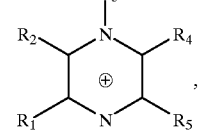

Pyrazinium

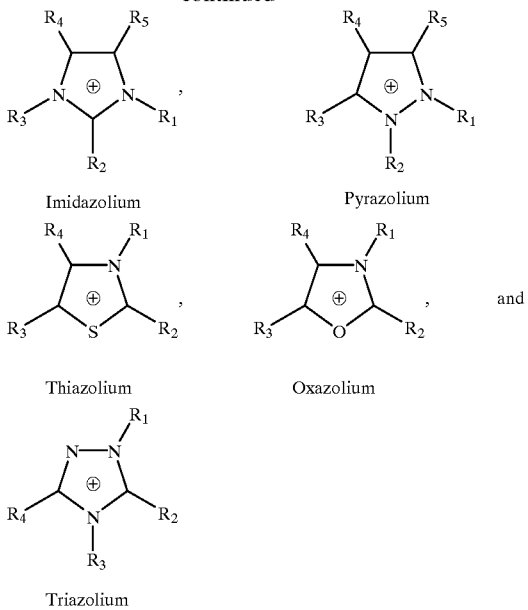

Imidazolium   Pyrazolium

Thiazolium   Oxazolium   and

Triazolium wherein $R_1$, $R_2$, $R_3$, $R_4$, $R_5$, and $R_6$ are independently selected from the group consisting of H, F, alkyl groups of from 1 to about 4 carbon atoms, two said alkyl groups joined together to form a unitary alkylene radical of from 2 to 4 carbon atoms forming a ring structure converging on N, and phenyl groups; and wherein said alkyl groups, alkylene radicals, or phenyl groups can be substituted with one or more electron withdrawing groups (preferably selected from the group consisting of F—, Cl—, $CF_3$—, $SF_5$—, $CF_3S$—, $(CF_3)_2CHS$—, and $(CF_3)_3CS$—).

More preferred aromatic cations include those selected from the group consisting of

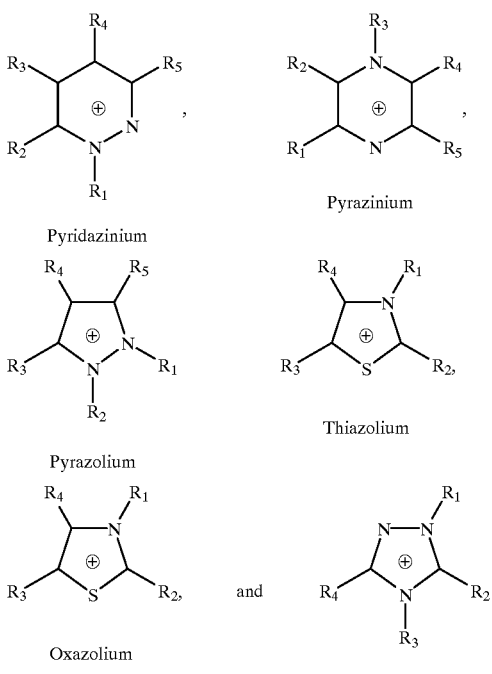

Pyridazinium   Pyrazinium

Pyrazolium   Thiazolium

Oxazolium   and   Triazolium where $R_1$, $R_2$, $R_3$, $R_4$, and $R_5$ are as defined above.

The weakly coordinating anion is a fluoroorganic anion, the conjugate acid of which is a superacid (that is, an acid that is more acidic than 100 percent sulfuric acid). Preferably, the Hammett acidity function, $H_0$, of the conjugate acid of the anion is less than about −10 (more preferably, less than about −12). Such weakly coordinating fluoroorganic anions include those that comprise at least one highly fluorinated alkanesulfonyl group, that is, a perfluoroalkanesulfonyl group or a partially fluorinated alkanesulfonyl group wherein all non-fluorine carbon-bonded substituents are bonded to carbon atoms other than the carbon atom that is directly bonded to the sulfonyl group (preferably, all non-fluorine carbon-bonded substituents are bonded to carbon atoms that are more than two carbon atoms away from the sulfonyl group).

Preferably, the anion is at least about 80 percent fluorinated (that is, at least about 80 percent of the carbon-bonded substituents of the anion are fluorine atoms). More preferably, the anion is perfluorinated (that is, fully fluorinated, where all of the carbon-bonded substituents are fluorine atoms). The anions, including the preferred perfluorinated anions, can contain one or more catenary (that is, in-chain) heteroatoms such as, for example, nitrogen, oxygen, or sulfur.

Suitable weakly coordinating anions include, but are not limited to, anions selected from the group consisting of perfluoroalkanesulfonates, cyanoperfluoroalkanesulfonylamides, bis(cyano) perfluoroalkanesulfonylmethides, bis(perfluoroalkanesulfonyl)imides, bis(perfluoroalkanesulfonyl)methides, and tris(perfluoroalkanesulfonyl)methides.

Preferred anions include perfluoroalkanesulfonates, bis(perfluoroalkanesulfonyl)imides, and tris(perfluoroalkanesulfonyl)methides. The bis(perfluoroalkanesulfonyl)imides and tris(perfluoroalkanesulfonyl)methides are more preferred anions, with the bis(perfluoroalkanesulfonyl)imides being most preferred.

The ionic salts can be solids or liquids under use conditions but preferably have melting points less than about 150° C. (more preferably, less than about 50° C.; most preferably, less than about 25° C.). Liquid ionic salts are preferred due to their generally better static dissipative performance. The ionic salts are preferably stable at temperatures of about 325° C. and above (more preferably, about 350° C. and above). (In other words, the onset of decomposition of the salts is above such temperatures.) The salts are also preferably hydrophobic. Thus, a preferred class of ionic salts for use in the antistatic composition of the invention includes those that consist of (a) an aromatic nitrogen onium cation selected from the group consisting of

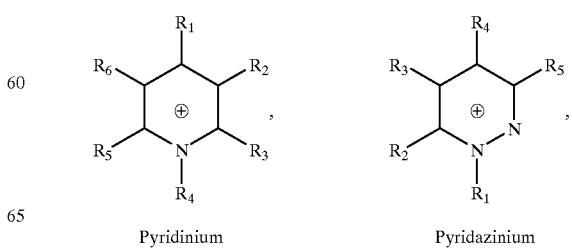

Pyridinium   Pyridazinium

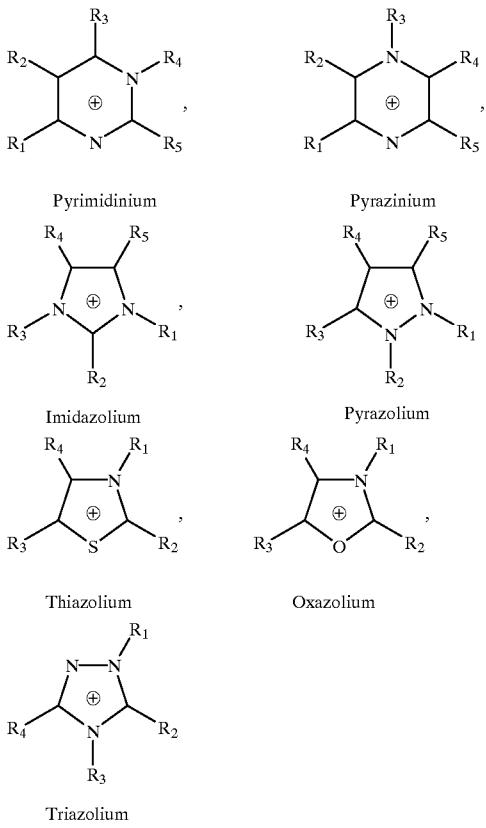

Pyrimidinium

Pyrazinium

Imidazolium

Pyrazolium

Thiazolium

Oxazolium and

Triazolium wherein $R_1$, $R_2$, $R_3$, $R_4$, $R_5$, and $R_6$ are independently selected from the group consisting of H, F, alkyl groups of from 1 to about 4 carbon atoms, two said alkyl groups joined together to form a unitary alkylene radical of from 2 to 4 carbon atoms forming a ring structure converging on N, and phenyl groups; and wherein said alkyl groups, alkylene radicals, or phenyl groups can be substituted with one or more electron withdrawing groups (preferably selected from the group consisting of F—, Cl—, $CF_3$—, $SF_5$—, $CF_3S$—, $(CF_3)_2CHS$—, and $(CF_3)_3CS$—); and (b) a weakly coordinating fluoroorganic anion in accordance with the above description or a weakly coordinating anion selected from the group consisting of $BF_4^-$, $PF_6^-$, $AsF_6^-$, and $SbF_6^-$. This preferred class comprises a subclass of the hydrophobic ionic liquids described in U.S. Pat. No. 5,827,602 (Koch et al.), the description of the members of which is incorporated herein by reference.

Another preferred class of ionic salts useful in preparing the antistatic composition of the invention is the class of novel compounds represented by Formula I below $$(R_1)_{4-z}N^+[(CH_2)_qOR_2]_zX^- \qquad (I)$$

wherein each $R_1$ is independently selected from the group consisting of alkyl, alicyclic, aryl, alkalicyclic, alkaryl, alicyclicalkyl, aralkyl, aralicyclic, and alicyclicaryl moieties that can contain one or more heteroatoms such as, for example, nitrogen, oxygen, sulfur, phosphorus, or halogen (and thus can be fluoroorganic in nature); each $R_2$ is independently selected from the group consisting of hydrogen and the moieties described above for $R_1$; z is an integer of 1 to 4; q is an integer of 1 to 4; and $X^-$ is a weakly coordinating fluoroorganic anion as described above. $R_1$ is preferably alkyl, and $R_2$ is preferably selected from the group consisting of hydrogen, alkyl, and acyl (more preferably, hydrogen or acyl; most preferably, hydrogen).

The above-described ionic salts that are useful in the antistatic composition of the invention can be prepared by ion exchange or metathesis reactions, which are well known in the art. For example, a precursor onium salt (for example, an onium halide, onium alkanesulfonate, onium alkanecarboxylate, or onium hydroxide salt) can be combined with a precursor metal salt or the corresponding acid of a weakly coordinating anion in aqueous solution. Upon combining, the desired product (the onium salt of the weakly coordinating anion) precipitates (as a liquid or solid) or can be preferentially extracted into an organic solvent (for example, methylene chloride). The product can be isolated by filtration or by liquid/liquid phase separation, can be washed with water to completely remove by product metal halide salt or hydrogen halide, and can then be dried thoroughly under vacuum to remove all volatiles (including water and organic solvent, if present). Similar metathesis reactions can be conducted in organic solvents (for example, acetonitrile) rather than in water, and, in this case, the salt by product preferentially precipitates, while the desired product salt remains dissolved in the organic solvent (from which it can be isolated using standard experimental techniques). A few of the ionic salts (for example, 1-ethyl-3-methylimidazolium trifluoromethanesulfonate, available from Sigma Aldrich, Milwaukee, Wis.) are commercially available.

Precursor salts or acids (for use in preparing the ionic salts) can be prepared by standard methods known in the art, and many are commercially available. Such methods include the anion precursor preparative methods described in the following references, the descriptions of which are incorporated herein by reference: imide precursors—U.S. Pat. No. 5,874,616 (Howells et al.), U.S. Pat. No. 5,723,664 (Sakaguchi et al.), U.S. Pat. No. 5,072,040 (Armand), and U.S. Pat. No. 4,387,222 (Koshar); methide precursors—U.S. Pat. No. 5,554,664 (Lamanna et al.) and U.S. Pat. No. 5,273,840 (Dominey); sulfonate precursors—U.S. Pat. No. 5,176,943 (Wou), U.S. Pat. No. 4,582,781 (Chen et al.), U.S. Pat. No. 3,476,753 (Hanson), and U.S. Pat. No. 2,732,398 (Brice et al.); sulfonate, imide, and methide precursors having caternary oxygen or nitrogen in a fluorochemical group—U.S. Pat. No. 5,514,493 (Waddell et al.); disulfone precursors—R. J. Koshar and R. A. Mitsch, J. Org. Chem., 38, 3358 (1973) and U.S. Pat. No. 5,136,097 (Armand).

In general, cyano-containing methides and amides containing fluoroalkanesulfonyl groups can be prepared by the reaction of fluoroalkanesulfonyl fluorides, $R_fSO_2F$, with anhydrous malononitrile or cyanamide, respectively, in the presence of a non-nucleophilic base. This synthetic procedure is described in Scheme 1 of U.S. Pat. No. 5,874,616 (Howells et al.) for the preparation of bis (fluoroalkanesulfonyl)imides (the description of which is incorporated herein by reference) and involves the substitution of either malononitrile or cyanamide for the fluoroalkanesulfonamide. The resulting intermediate non-nucleophilic base cation-containing methide or amide salt can be converted to the desired cation salt (typically lithium) via standard metathesis reactions well known in the art.

Representative examples of useful ionic salts include octyldimethyl-2-hydroxyethylammonium bis (trifluoromethylsulfonyl)imide: $[C_8H_{17}N^+(CH_3)_2CH_2CH_2OH^-N(SO_2CF_3)_2]$, octyldimethyl-2-hydroxyethylammonium perfluorobutanesulfonate: $[C_8H_{17}N^+(CH_3)_2CH_2CH_2OH^-OSO_2C_4F_9]$, octyldimethyl-2-hydroxyethylammonium trifluoromethanesulfonate:

[C⁸H₁₇N⁺(CH₃)₂CH₂CH₂OH⁻OSO₂CF₃], octyldimethyl-2-hydroxyethylammonium tris(trifluoromethanesulfonyl)methide: [C₈H₁₇N⁺(CH₃)₂CH₂CH₂OH⁻C(SO₂CF₃)₃], trimethyl-2-acetoxyethylammonium bis(trifluoromethylsulfonyl)imide: [(CH₃)₃N⁺CH₂CH₂OC(O)CH3⁻N(SO₂CF₃)₂], trimethyl-2-hydroxyethylammonium bis(perfluorobutanesulfonyl)imide: [(CH₃)₃N⁺CH₂CH₂OH⁻N(SO₂C₄F₉)₂], triethylammonium bis(perfluoroethanesulfonyl)imide: [Et₃N⁺H⁻N(SO₂C₂F₅)₂], tetraethylammonium trifluoromethanesulfonate: [CF₃SO₃⁻⁺NEt₄], tetraethylammonium bis(trifluoromethanesulfonyl)imide: [(CF₃SO₂)₂N⁻⁺NEt₄], tetramethylammonium tris(trifluoromethanesulfonyl)methide: [(CH₃)₄N⁺⁻C(SO₂CF₃)₃], tetrabutylammonium bis(trifluoromethanesulfonyl)imide: [(C₄H₉)₄N⁺⁻N(SO₂CF₃)₂], trimethyl-3-perfluorooctylsulfonamidopropylammonium bis(trifluoromethanesulfonyl)imide: [C₈F₁₇SO₂NH(CH₂)₃N⁺(CH₃)₃⁻N(SO₂CF₃)₂], 1-hexadecylpyridinium bis(perfluoroethanesulfonyl)imide: [n-C₁₆H₃₃-cyc-N⁺C₅H₅⁻N(SO₂C₂F₅)₂], 1-hexadecylpyridinium perfluorobutanesulfonate: [n-C₁₆H₃₃-cyc-N⁺C₅H₅⁻OSO₂C₄F₉], 1-hexadecylpyridinium perfluorooctanesulfonate: [n-C₁₆H₃₃-cyc-N⁺C₅H₅⁻OSO₂C₈F₁₇], n-butylpyridinium bis(trifluoromethanesulfonyl)imide: [n-C₄H₉-cyc-N⁺C₅H₅⁻N(SO₂CF₃)₂], n-butylpyridinium perfluorobutanesulfonate: [n-C₄H₉-cyc-N⁺C₅H₅⁻OSO₂C₄F₉], 1,3-ethylmethylimidazolium bis(trifluoromethanesulfonyl)imide: [CH₃-cyc-(N⁺C₂H₂NCH)CH₂CH₃⁻N(SO₂CF₃)₂], 1,3-ethylmethylimidazolium nonafluorobutanesulfonate: [CH₃-cyc-(N⁺C₂H₂NCH)CH₂CH₃⁻OSO₂C₄F₉], 1,3-ethylmethylimidazolium trifluoromethanesulfonate: [CH₃-cyc-(N⁺C₂H₂NCH)CH₂CH₃⁻OSO₂CF₃], 1,3-ethylmethylimidazolium hexafluorophosphate: [CH₃-cyc-(N⁺C₂H₂NCH)CH₂CH₃PF₆⁻], 1,3-ethylmethylimidazolium tetrafluoroborate: [CH₃-cyc-(N⁺C₂H₂NCH)CH₂CH₃BF₄⁻], 1,2-dimethyl-3-propylimidazolium bis(trifluoromethanesulfonyl)imide, 1,2-dimethyl-3-propylimidazolium tris(trifluoromethanesulfonyl)methide, 1,2-dimethyl-3-propylimidazolium trifluoromethanesulfonyl perfluorobutanesulfonylimide, 1-ethyl-3-methylimidazolium cyanotrifluoromethanesulfonylamide, 1-ethyl-3-methylimidazolium bis(cyano)trifluoromethanesulfonylmethide, 1-ethyl-3-methylimidazolium trifluoromethanesulfonylperfluorobutanesulfonylimide, octyldimethyl-2-hydroxyethylammonium trifluoromethylsulfonylperfluorobutanesulfonylimide, 2-hydroxyethytrimethyl trifluoromethylsulfonylperfluorobutanesulfonylimide, 2-methoxyethyltrimethylammonium bis(trifluoromethanesulfonyl)imide octyldimethyl-2-hydroxyethylammonium bis(cyano)trifluoromethanesulfonylmethide, trimethyl-2-acetoxyethylammonium trifluoromethylsulfonylperfluorobutanesulfonylimide, 1-butylpyridinium trifluoromethylsulfonylperfluorobutanesulfonylimide, 2-ethoxyethyltrimethylammonium trifluoromethanesulfonate, 1-butyl-3-methylimidazolium perfluorobutanesulfonate, perfluoro-1-ethyl-3-methylimidazolium bis(trifluoromethanesulfonyl)imide, 1-ethyl-2-methylpyrazolium perfluorobutanesulfonate, 1-butyl-2-ethylpyrazolium trifluoromethanesulfonate, N-ethylthiazolium bis(trifluoromethanesulfonyl)imide, N-ethyloxazolium bis(trifluoromethanesulfonyl)imide, and 1-butylpyrimidinium perfluorobutanesulfonylbis(trifluoromethanesulfonyl)methide, 1,3-ethylmethylimidazolium hexafluorophosphate, 1,3-ethylmethylimidazolium tetrafluoroborate, and mixtures thereof.

Preferred ionic salts include octyldimethyl-2-hydroxyethylammonium bis(trifluoromethylsulfonyl)imide: [C₈H₁₇N⁺(CH₃)₂CH₂CH₂OH⁻N(SO₂CF₃)₂], octyldimethyl-2-hydroxyethylammonium perfluorobutanesulfonate: [C₈H₁₇N⁺(CH₃)₂CH₂CH₂OH⁻OSO₂C₄F₉], octyldimethyl-2-hydroxyethylammonium trifluoromethanesulfonate: [C₈H₁₇N⁺(CH₃)₂CH₂CH₂OH⁻OSO₂CF₃], octyldimethyl-2-hydroxyethylammonium tris(trifluoromethanesulfonyl)methide: [C₈H₁₇N⁺(CH₃)₂CH₂CH₂OH⁻C(SO₂CF₃)₃], trimethyl-2-acetoxyethylammonium bis(trifluoromethylsulfonyl)imide: [(CH₃)₃N⁺CH₂CH₂OC(O)CH3⁻N(SO₂CF₃)₂], trimethyl-2-hydroxyethylammonium bis(perfluorobutanesulfonyl)imide: [(CH₃)₃N⁺CH₂CH₂OH⁻N(SO₂C₄F₉)₂], triethylammonium bis(perfluoroethanesulfonyl)imide: [Et₃N⁺H⁻N(SO₂C₂F₅)₂], tetraethylammonium trifluoromethanesulfonate: [CF₃SO₃⁻⁺NEt₄], tetraethylammonium bis(trifluoromethanesulfonyl)imide: [(CF₃SO₂)₂N⁻⁺NEt₄], tetramethylammonium tris(trifluoromethanesulfonyl)methide: [(CH₃)₄N⁺⁻C(SO₂CF₃)₃], tetrabutylammonium bis(trifluoromethanesulfonyl)imide: [(C₄H₉)₄N⁺⁻N(SO₂CF₃)₂], trimethyl-3-perfluorooctylsulfonamidopropylammonium bis(trifluoromethanesulfonyl)imide: [C₈F₁₇SO₂NH(CH₂)₃N⁺(CH₃)₃⁻N(SO₂CF₃)₂], 1-hexadecylpyridinium bis(perfluoroethanesulfonyl)imide: [n-C₁₆H₃₃-cyc-N⁺C₅H₅⁻N(SO₂C₂F₅)₂], 1-hexadecylpyridinium perfluorobutanesulfonate: [n-C₁₆H₃₃-cyc-N⁺C₅H₅⁻OSO₂C₄F₉], 1-hexadecylpyridinium perfluorooctanesulfonate: [n-C₁₆H₃₃-cyc-N⁺C₅H₅⁻OSO₂C₈F₁₇], n-butylpyridinium bis(trifluoromethanesulfonyl)imide: [n-C₄H₉-cyc-N⁺C₅H₅⁻N(SO₂CF₃)₂], n-butylpyridinium perfluorobutanesulfonate: [n-C₄H₉-cyc-N⁺C₅H₅⁻OSO₂C₄F₉], 1,3-ethylmethylimidazolium bis(trifluoromethanesulfonyl)imide: [CH₃-cyc-(N⁺C₂H₂NCH)CH₂CH₃⁻N(SO₂CF3)₂], 1,3-ethylmethylimidazolium nonafluorobutanesulfonate: [CH₃-cyc-(N⁺C₂H₂NCH)CH₂CH₃⁻OSO₂C₄F₉], 1,3-ethylmethylimidazolium trifluoromethanesulfonate: [CH₃-cyc-(N⁺C₂H₂NCH)CH₂CH₃⁻OSO₂CF₃], 1,3-ethylmethylimidazolium tetrafluorobroate, and mixtures thereof.

More preferred ionic salts include 2-hydroxyethylammonium bis(trifluoromethylsulfonyl)imide, octyldimethyl-2-hydroxyethylammonium perfluorobutanesulfonate, octyldimethyl-2-hydroxyethylammonium trifluoromethanesulfonate, triethylammonium bis(perfluoroethanesulfonyl)imide, tetraethylammonium trifluoromethanesulfonate, trimethyl-3-perfluorooctylsulfonamidopropylammonium bis(trifluoromethanesulfonyl)imide, 1,3-ethylmethylimidazolium nonafluorobutanesulfonate, 1,3-ethylmethylimidazolium bis(trifluoromethanesulfonyl)imide, 1,3-ethylmethylimidazolium trifluoromethanesulfonate, and mixtures thereof.

Most preferred ionic salts include 2-hydroxyethylammonium bis(trifluoromethylsulfonyl)imide, octyldimethyl-2-hydroxyethylammonium trifluoromethanesulfonate, triethylammonium bis(perfluoroethanesulfonyl)imide, 1,3-ethylmethylimidazolium nonafluorobutanesulfonate, 1,3-ethylmethylimidazolium bis(trifluoromethanesulfonyl)imide, 1,3-ethylmethylimidazolium trifluoromethanesulfonate, and mixtures thereof, with further preferences being in accordance with the general cation and anion preferences set forth above.

Insulating materials that are suitable for topical treatment include materials that have relatively low surface and bulk conductivity and that are prone to static charge buildup. Such materials include both synthetic and naturally-occurring polymers (or the reactive precursors thereof, for example, mono- or multifunctional monomers or oligomers) that can be either organic or inorganic in nature, as well as ceramics, glasses, and ceramers (or the reactive precursors thereof).

Suitable synthetic polymers (which can be either thermoplastic or thermoset) include commodity plastics such as, for example, poly(vinyl chloride), polyethylenes (high density, low density, very low density), polypropylene, and polystyrene; engineering plastics such as, for example, polyesters (including, for example, poly(ethylene terephthalate) and poly(butylene terephthalate)), polyamides (aliphatic, amorphous, aromatic), polycarbonates (for example, aromatic polycarbonates such as those derived from bisphenol A), polyoxymethylenes, polyacrylates and polymethacrylates (for example, poly(methyl methacrylate)), some modified polystyrenes (for example, styrene-acrylonitrile (SAN) and acrylonitrile-butadiene-styrene (ABS) copolymers), high-impact polystyrenes (SB), fluoroplastics, and blends such as poly(phenylene oxide)-polystyrene and polycarbonate-ABS; high-performance plastics such as, for example, liquid crystalline polymers (LCPs), polyetherketone (PEEK), polysulfones, polyimides, and polyetherimides; thermosets such as, for example, alkyd resins, phenolic resins, amino resins (for example, melamine and urea resins), epoxy resins, unsaturated polyesters (including so-called vinyl esters), polyurethanes, allyllics (for example, polymers derived from allyldiglycolcarbonate), fluoroelastomers, and polyacrylates; and the like and blends thereof. Suitable naturally occurring polymers include proteinaceous materials such as silk, wool, and leather; and cellulosic materials such as cotton and wood.

Particularly useful insulating materials are thermoplastic polymers, including those described above, as such polymers can be used in preparing the antistatic composition of the invention. Preferably, the thermoplastic polymers are melt processable at elevated temperatures, for example, above about 150° C. (more preferably, above about 250° C.; even more preferably, above about 280° C.; most preferably, above about 320° C.). Preferred thermoplastic polymers include, for example, polypropylene, polyethylene, copolymers of ethylene and one or more alpha-olefins (for example, poly(ethylene-butene) and poly(ethylene-octene)), polyesters, polyurethanes, polycarbonates, polyetherimides, polyimides, polyetherketones, polysulfones, polystyrenes, ABS copolymers, polyamides, fluoroelastomers, and blends thereof. More preferred are polypropylene, polyethylene, polyesters, polyurethanes, polycarbonates, and blends thereof, with polypropylene, polycarbonates, polyesters, and blends thereof being most preferred.

The antistatic composition of the invention can generally be prepared by combining at least one ionic salt (alone or in combination with other additives) and at least one thermoplastic polymer and then melt processing the resulting combination. Alternative processes for preparing an antistatic composition include, for example, (a) combining at least one ionic salt (alone or in combination with other additives) and at least one thermosetting polymer or ceramer (or the reactive precursors thereof) and then allowing the resulting combination to cure, optionally with the application of heat or actinic radiation; (b) applying a treatment composition comprising at least one ionic salt to at least a portion of at least one surface of at least one insulating material; (c) dissolving at least one ionic salt and at least one insulating material in at least one solvent and then casting or coating the resulting solution and allowing evaporation of the solvent, optionally with the application of heat; and (d) combining at least one ionic salt (alone or in combination with other additives) and at least one monomer and then allowing polymerization of the monomer to occur, optionally in the presence of at least one solvent and optionally with the application of heat or actinic radiation.

To form a melt blend by melt processing, the ionic salt(s) can be, for example, intimately mixed with pelletized or powdered polymer and then melt processed by known methods such as, for example, molding, melt blowing, melt spinning, or melt extrusion. The salt(s) can be mixed directly with the polymer or they can be mixed with the polymer in the form of a "master batch" (concentrate) of the salt(s) in the polymer. If desired, an organic solution of the salt(s) can be mixed with powdered or pelletized polymer, followed by drying (to remove solvent) and then by melt processing. Alternatively, molten salt(s) can be injected into a molten polymer stream to form a blend immediately prior to, for example, extrusion into fibers or films or molding into articles.

After melt processing, an annealing step can be carried out to enhance the development of antistatic characteristics. In addition to, or in lieu of, such an annealing step, the melt processed combination (for example, in the form of a film or a fiber) can also be embossed between two heated rolls, one or both of which can be patterned. An annealing step typically is conducted below the melt temperature of the polymer (for example, in the case of polyamide, at about 150–220° C. for a period of about 30 seconds to about 5 minutes). In some cases, the presence of moisture can improve the effectiveness of the ionic salt(s), although the presence of moisture is not necessary in order for antistatic characteristics to be obtained.

The ionic salt(s) can be added to thermoplastic polymer (or, alternatively, to other insulating material) in an amount sufficient to achieve the desired antistatic properties for a particular application. This amount can be determined empirically and can be adjusted as necessary or desired to achieve the antistatic properties without compromising the properties of the polymer (or other insulating material). Generally, the ionic salt(s) can be added in amounts ranging from about 0.1 to about 10 percent by weight (preferably, from about 0.5 to about 2 percent; more preferably, from about 0.75 to about 1.5 percent) based on the weight of polymer (or other insulating material).

In topical treatment of an insulating material, the ionic salt(s) can be employed alone or in the form of aqueous suspensions, emulsions, or solutions, or as organic solvent solutions, in the topical treatment of the insulating material. Useful organic solvents include chlorinated hydrocarbons, alcohols (for example, isopropyl alcohol), esters, ketones (for example, methyl isobutyl ketone), and mixtures thereof. Generally, the solvent solutions can contain from about 0.1 to about 50 percent, or even up to about 90 percent, by weight non-volatile solids (based on the total weight of the components). Aqueous suspensions, emulsions, or solutions are generally preferred and generally can contain a non-volatile solids content of about 0.1 to about 50 percent, preferably, about 1 to about 10 percent, by weight (based on the total weight of the components). Preferably, however, topical treatment is carried out by applying (to at least a portion of at least one surface of at least one insulating material) a topical treatment composition that consists essentially of at least one ionic salt that is liquid at the use or treatment temperature. Such a topical treatment process involves the use of the neat liquid ionic salt, without added solvent, and is thus preferred from an environmental perspective over the use of organic solvent solutions of ionic salt(s).

The liquid ionic salt(s) (or suspensions, emulsions, or solutions of liquid or solid ionic salt(s)) can be applied to an insulating material by standard methods such as, for example, spraying, padding, dipping, roll coating, brushing, or exhaustion (optionally followed by the drying of the treated material to remove any remaining water or solvent). The material can be in the form of molded or blown articles, sheets, fibers (as such or in aggregated form, for example, yarn, toe, web, or roving, or in the form of fabricated textiles such as carpets), woven and nonwoven fabrics, films, etc. If desired, the salt(s) can be co-applied with conventional fiber treating agents, for example, spin finishes or fiber lubricants.

The liquid ionic salts(s) (or suspensions, emulsions, or solutions of liquid or solid ionic salt(s)) can be applied in an amount sufficient to achieve the desired antistatic properties for a particular application. This amount can be determined empirically and can be adjusted as necessary or desired to achieve the antistatic properties without compromising the properties of the insulating material.

Any of a wide variety of constructions can be made from the antistatic composition of the invention, and such constructions will find utility in any application where some level of antistatic characteristic is required. For example, the antistatic composition of the invention can be used to prepare films and molded or blown articles, as well as fibers (for example, melt-blown or melt-spun fibers, including microfibers) that can be used to make woven and nonwoven fabrics. Such films, molded or blown articles, fibers, and fabrics exhibit antistatic characteristics under a variety of environmental conditions and can be used in a variety of applications.

For example, molded articles comprising the antistatic composition of the invention can be prepared by standard methods (for example, by high temperature injection molding) and are particularly useful as, for example, headlamp covers for automobiles, lenses (including eyeglass lenses), casings or circuit boards for electronic devices (for example, computers), screens for display devices, windows (for example, aircraft windows), and the like. Films comprising the antistatic composition of the invention can be made by any of the film making methods commonly employed in the art. Such films can be nonporous or porous (the latter including films that are mechanically perforated), with the presence and degree of porosity being selected according to the desired performance characteristics. The films can be used as, for example, photographic films, transparency films for use with overhead projectors, tape backings, substrates for coating, and the like.

Fibers comprising the composition of the invention can be used to make woven or nonwoven fabrics that can be used, for example, in making medical fabrics, medical and industrial apparel, fabrics for use in making clothing, home furnishings such as rugs or carpets, and filter media such as chemical process filters or respirators. Nonwoven webs or fabrics can be prepared by processes used in the manufacture of either melt-blown or spunbonded webs. For example, a process similar to that described by Wente in "Superfine Thermoplastic Fibers," Indus. Eng'g Chem. 48, 1342 (1956) or by Wente et al. in "Manufacture of Superfine Organic Fibers," Naval Research Laboratories Report No. 4364 (1954) can be used. Multi-layer constructions made from nonwoven fabrics enjoy wide industrial and commercial utility, for example, as medical fabrics. The makeup of the constituent layers of such multi-layer constructions can be varied according to the desired end-use characteristics, and the constructions can comprise two or more layers of melt-blown and spunbonded webs in many useful combinations such as those described in U.S. Pat. No. 5,145,727 (Potts et al.) and U.S. Pat. No. 5,149,576 (Potts et al.), the descriptions of which are incorporated herein by reference.

The ionic salts used in the antistatic composition of the invention can also find utility as additives to coatings (for example, polymer or ceramer coatings). Such coatings can be both antistatic and scratch-resistant and can be used in the photographic industry or as protective coatings for optical or magnetic recording media.

If desired, the antistatic composition of the invention can further contain one or more conventional additives commonly used in the art, for example, dyes, pigments, antioxidants, ultraviolet stabilizers, flame retardants, surfactants, plasticizers (for example, polymers such as polybutylene), tackifiers, fillers, and mixtures thereof.

Objects and advantages of this invention are further illustrated by the following examples, but the particular materials and amounts thereof recited in these examples, as well as other conditions and details, should not be construed to unduly limit this invention.

GLOSSARY

HTS 905A—Larostat™ HTS 905A, $C_8H_{17}N^+(CH_3)_2CH_2CH_2OH^-OSO_2CH_3$, available from BASF, Gurnee, Ill.

HQ-115—$LiN(SO_2CF_3)_2$ available from 3M, St. Paul, Minn.

PBSF—Perfluorobutanesulfonyl fluoride, available from Sigma-Aldrich, Milwaukee, Wis.

Lithium triflate—Lithium trifluoromethanesulfonate, available from Sigma-Aldrich, Milwaukee, Wis.

FC-24—Trifluoromethanesulfonic acid, available from 3M, St. Paul, Minn.

FC-754—Trimethyl-3-perfluorooctylsulfonamidopropylammonium chloride, available from 3M, St. Paul, Minn.

Aliquat™ 336—Methyltrioctylammonium chloride, available from Sigma-Aldrich, Milwaukee, Wis., or from Henkel Corp., Ambler, Pa.

FC-94—Lithium perfluorooctanesulfonate, available from 3M, St. Paul, Minn.

Cetylpyridinium chloride monohydrate—1-Hexadecylpyridinium chloride, available from Research Organics, Cleveland, Ohio.

1,3-Ethylmethylimidazolium chloride—Available from Sigma-Aldrich, Milwaukee, Wis.

Silver triflate—Silver trifluoromethanesulfonate, available from Sigma-Aldrich, Milwaukee, Wis.

$AgBF_4$—Silver tetrafluoroborate, available from Sigma-Aldrich, Milwaukee, Wis.

$NH_4PF_6$—Ammonium hexafluorophosphate, available from Sigma-Aldrich, Milwaukee, Wis.

Acetylcholine chloride—$CH_3CO_2CH_2CH_2N(CH_3)_3Cl$, available from Research Organics, Cleveland, Ohio.

Choline chloride—$HOCH_2CH_2N(CH_3)_3Cl$, available from Sigma-Aldrich, Milwaukee, Wis.

PP3505—ESCORENE™ PP3505 polypropylene, having a 400 melt index flow rate, available from Exxon Chemical Co., Baytown, Tex.

PE6806—ASPUN™ 6806 polyethylene, having a melt flow index of 105 g/10 min (as measured by Test Method ASTM D-1238) and having a peak melting point of 124.8° C., available from Dow Chemical Co., Midland, Mich.

PS440-200—MORTHANE™ PS440-200 urethane, available from Morton Thiokol Corp., Chicago, Ill.

PET 65-1000—polyethylene terephthalate available from the 3M Company, Decatur, Ala.

LQ-3147—Makrolon® LQ-3147 polycarbonate available from Bayer Corp., Pittsburg, Pa.

Mellinex 617—Melamine primed polyethylene terephthalate film (0.177 mm thick), available from DuPont, Hopewell, Va.

TEST METHODS

Test Method I—Melting Point Determination

The melting points of salts were determined by differential scanning calorimetry (DSC) using a 20° C. per minute temperature ramp. The peak maximum of the melt transition was taken as the melting point (Tm). Where multiple melt transitions were observed, the peak associated with largest area melt transition was taken as the melting point.

Test Method II—Onset of Thermal Decomposition Determination

The onset of thermal decomposition of each salt was determined by thermal gravimetric analysis (TGA) under an inert nitrogen atmosphere using a 10° C. per minute temperature ramp. The value of the onset temperature was determined by finding the intersection of the extrapolated tangent at the baseline preceding onset and the extrapolated tangent at the inflection point associated with the step change in sample weight.

Test Method III—Static Charge Dissipation Test

The static charge dissipation characteristics of nonwoven fabrics, films, and molded sheets were determined with this method. The test materials were cut into 9 cm by 12 cm samples and conditioned at relative humidities (RH) of about 10 percent, 25 percent, and 50 percent for at least 12 hours. The materials were tested at temperatures that ranged from 22–25° C. The static charge dissipation time was measured according to Federal Test Method Standard 10113, Method 4046, "Antistatic Properties of Materials", using an ETS Model 406C Static Decay Test Unit (manufactured by Electro-Tech Systems, Inc., Glenside, Pa.). This apparatus induces an initial static charge (Average Induced Electrostatic Charge) on the surface of the flat test material by using high voltage (5000 volts), and a fieldmeter allows observation of the decay time of the surface voltage from 5000 volts (or whatever the induced electrostatic charge was) to 10 percent of the initial induced charge. This is the static charge dissipation time. The lower the static charge dissipation time, the better the antistatic properties are of the test material. All reported values of the static charge dissipation times in this invention are averages (Average Static Decay Rate) over at least 3 separate determinations. Values reported as >60 sec indicate that the material tested has an initial static charge which cannot be removed by surface conduction and is not antistatic.

Test Method IV—Surface Resistivity Test

This test was conducted according to the procedure of ASTM Standard D-257, "D.C. Resistance or Conductance of Insulating Materials". The surface resistivity was measured under the conditions of this test method using an ETS Model 872 Wide Range Resistance Meter fitted with a Model 803B probe (Electro-Tech Systems, Inc., Glenside, Pa.). This apparatus applies an external voltage of 100 volts across two concentric ring electrodes contacting the flat test material, and provides surface resistivity readings in ohm/square units.

In the following where weight percent or parts by weight are indicated, these are basis on the weight of the entire composition unless indicated otherwise.

PREPARATION OF COMPOUNDS

Compound 1

Synthesis of Triethylammonium bis (perfluoroethanesulfonyl)imide, $Et_3N^+H^-N(SO_2C_2F_5)_2$ The title compound was prepared according to the method described in U.S. Pat. No. 5,874,616, Example 3, except that the procedure was terminated once the methylene chloride solvent was evaporated. The product was characterized for melting point ($T_m$) according to Test Method I and for onset of thermal decomposition ($T_d$) according to Test Method II. Results are shown in Table 2.

Compound 2

Synthesis of Tetraethylammonium trifluoromethanesulfonate, $CF_3SO_3^{-+}NEt_4$

In a 2 L flask, 300 g of $CF_3SO_3H$ (FC-24) was charged. The acid was neutralized by slow addition of about 800 g $Et_4NOH$ aqueous solution (35%) until the pH reached about 6. A white solid (560 g) was obtained after drying by rotary evaporation, then under high vacuum. The solid was re-crystallized from chloroform-heptane to give 520 g pure product. The product was also characterized for melting point ($T_m$) according to Test Method I and for onset of thermal decomposition ($T_d$) according to Test Method II. Results are shown in Table 2.

Compound 3

Synthesis of Tetraethylammonium bis (trifluoromethanesulfonyl)imide, $(CF_3SO_2)_2N^{-+}NEt_4$ in Water-$CH_2Cl_2$ Mixed Solvent In a 1 L flask, 50 g of $(CF_3SO_2)_2N^-Li^+$ (HQ-115) was dissolved in 50 g of deionized water. The solution was combined with 89 g of 35% $Et_4NOH$ aqueous solution under $N_2$. Solid precipitated during the addition, which was dissolved by the addition of 50 g $CH_2Cl_2$. The bottom organic layer was isolated. The aqueous solution was extracted with another 50 g of $CH_2Cl_2$. The combined organic solution was washed with water (2×25 mL), and volatiles were removed by rotary evaporation. Re-crystallization of the crude product from $CH_3OH$—$H_2O$ gave 70 g of white solid after full vacuum drying. The product was characterized for melting point ($T_m$) according to Test Method I and for onset of thermal decomposition ($T_d$) according to Test Method II. Results are shown in Table 2.

Compound 4

Synthesis of Tetramethylammonium tris (trifluoromethanesulfonyl)methide, $(CH_3)_4N^{+-}C(SO_2CF_3)_3$ The title compound was prepared according to the method of U.S. Pat. No. 5,554,664, Example 18, except that the procedure was terminated after line 55. The product was characterized for melting point ($T_m$) according to Test Method I and for onset of thermal decomposition ($T_d$) according to Test Method II. Results are shown in Table 2.

Compound 5

Synthesis of Tetrabutylammonium bis (trifluoromethanesulfonyl)imide, $(C_4H_9)_4N^{+-}N(SO_2CF_3)_2$ The title compound was prepared by reacting $(C_4H_9)_4N^+Br^-$ (Sigma-Aldrich, Milwaukee, Wis.) with approximately a 10% molar excess of Li$^{+-}$N(SO$_2$CF$_3$)$_2$ (HQ-115) according to the procedure described in Example 18. The product was characterized for melting point (T$_m$) according to Test Method I and for onset of thermal decomposition (T$_d$) according to Test Method II. Results are shown in Table 2.

Compound 6

Synthesis of 1-Hexadecylpyridinium Bis (perfluoroethanesulfonyl)imide, n-C$_{16}$H$_{33}$-cyc-N$^+$C$_5$H$_5^-$N(SO$_2$C$_2$F$_5$)$_2$ The title compound was prepared according to the method of Example 14, except that 85.1 g of Li$^{+-}$N(SO$_2$C$_2$F$_5$)$_2$ (HQ-115) was employed as the anion precursor. The product was characterized for melting point (T$_m$) according to Test Method I and for onset of thermal decomposition (T$_d$) according to Test Method II. Results are shown in Table 3.

Compound 7

Synthesis of 1-Hexadecylpyridinium Perfluorobutanesulfonate, n-C$_{16}$H$_{33}$-cyc-N$^+$C$_5$H$_5^-$OSO$_2$C$_4$F$_9$ Cetylpyridinium chloride monohydrate (75 g) was dissolved in 800 ml water with gentle heating and magnetic stirring. To this solution was added 67.3 g of Li$^{+-}$OSO$_2$C$_4$F$_9$ (prepared by hydrolysis of C$_4$F$_9$SO$_2$F [PBSF] with LiOH) dissolved in 600 mL of water with stirring. Product precipitated immediately and was isolated by suction filtration. The product was washed with copious amounts of water and then dried initially by suction and then in vacuo at 10$^{-2}$ Torr, 40° C. The product was characterized for melting point (T$_m$) according to Test Method I and for onset of thermal decomposition (T$_d$) according to Test Method II. Results are shown in Table 3.

Compound 8

Synthesis of 1-Hexadecylpyridinium Perfluorooctanesulfonate, n-C$_{16}$H$_{33}$-cyc-N$^+$C$_5$H$_5^-$OSO$_2$C$_8$F$_{17}$ The title compound was prepared according to the method of Example 14, except that 111.3 g of Li$^{+-}$OSO$_2$C$_8$F$_{17}$ (FC-94) was employed as the anion precursor. The product was characterized for melting point (T$_m$) according to Test Method I and for onset of thermal decomposition (T$_d$) according to Test Method II. Results are shown in Table 3.

Compound 9

Synthesis of n-Butylpyridinium Bis (trifluoromethanesulfonyl)imide, n-C$_4$H$_9$-cyc-N$^+$C$_5$H$_5^-$N(SO$_2$CF$_3$)$_2$ A solution of 50 g Li$^{+-}$N(SO$_2$CF$_3$)$_2$ (HQ-115) (287 g/mol, 0.174 mol) and 100 ml DI water was prepared. Another solution of 30 g butylpyridinium chloride (171.6 g/mol, 0.174) and 100 ml DI water was prepared. The two solutions were added to a separatory funnel along with 200 ml methylene chloride. The mixture was thoroughly shaken, and the phases were allowed to separate. The organic phase was isolated and washed with 3×200 ml DI water. The organic layer was then concentrated by reduced pressure distillation on a rotary evaporator. The resulting yellow oil was vacuum dried at 120 C. overnight to afford 70 g product (97% yield). The product was characterized for melting point (T$_m$) according to Test Method I and for onset of thermal decomposition (T$_d$) according to Test Method II. Results are shown in Table 3.

Compound 10

Synthesis of n-Butylpyridinium Perfluorobutanesulfonate, n-C$_4$H$_9$-cyc-N$^+$C$_5$H$_5^-$OSO$_2$C$_4$F$_9$ A solution of 20 g butylpyridinium chloride (171.6 g/mol, 0.116 mol) was made with 100 ml DI water. A similar solution was prepared using 35.7 g Li$^{+-}$OSO$_2$C$_4$F$_9$ (prepared by hydrolysis of C$_4$F$_9$SO$_2$F [PBSF] with LiOH) (306 g/mol, 0.116 mol) and 100 ml water. The two solutions were added to a separatory funnel along with 200 ml methylene chloride. The mixture was thoroughly shaken, and the phases were allowed to separate. The organic phase was isolated and washed with 200 ml DI water. The mixture was slow to separate, consequently further washings were not done. The organic layer was concentrated by reduced pressure distillation on a rotary evaporator. It was then dried under vacuum at 130 C. overnight. The isolated yellow oil weighed 44 g (87% yield). The product was characterized for melting point (T$_m$) according to Test Method I and for onset of thermal decomposition (T$_d$) according to Test Method II. Results are shown in Table 3.

Compound 11

Synthesis of 1,3-Ethylmethylimidazolium Bis (trifluoromethanesulfonyl)imide, CH$_3$-cyc-(N$^+$C$_2$H$_2$NCH)CH$_2$CH$_3^-$N(SO$_2$CF$_3$)$_2$ 1,3-Ethylmethylimidazolium chloride (50.0 g) and LiN(SO$_2$CF$_3$)$_2$ (HQ-115) (102.8 g) were combined in 500 mL of water with magnetic stirring. A nonmiscible light yellow oil of low viscosity separated as a lower liquid phase. The mixture was transferred to a separatory funnel combined with 500 mL of CH$_2$Cl$_2$ and the workup conducted essentially as described in Example 1. After vacuum stripping all volatiles, a total of 112.2 g (84% yield) of light yellow oil of high purity was obtained, which was identified as the title compound by $^1$H and $^{19}$F NMR. The product was also characterized for melting point (T$_m$) according to Test Method I and for onset of thermal decomposition (T$_d$) according to Test Method II. Results are shown in Table 4.

Compound 12

Synthesis of 1,3-Ethylmethylimidazolium Nonafluorobutanesulfonate, CH$_3$-cyc-(N$^+$C$_2$H$_2$NCH)CH$_2$CH$_3^-$OSO$_2$C$_4$F$_9$ 1,3-Ethylmethylimidazolium chloride (49.1 g) and LiOSO$_2$C$_4$F$_9$ (107.6 g, prepared by hydrolysis of C$_4$F$_9$SO$_2$F with LiOH) were combined in 500 mL of water with magnetic stirring. A homogeneous aqueous solution was formed, which was transferred to a separatory funnel, combined with 500 mL of CH$_2$Cl$_2$ and worked up according to the procedure in Example 1. After vacuum stripping all volatiles, a total of 65.0 g (47% yield) of light yellow oil of high purity was obtained, which was identified as the title compound by $^1$H and $^{19}$F NMR. The product was also characterized for melting point (T$_m$) according to Test Method I and for onset of thermal decomposition (T$_d$) according to Test Method II. Results are shown in Table 4.

Compound 13

Synthesis of 1,3-Ethylmethylimidazolium trifluoromethanesulfonate, CH$_3$-cyc-(N$^+$C$_2$H$_2$NCH)CH$_2$CH$_3^-$OSO$_2$CF$_3$ 1,3-Ethylmethylimidazolium chloride (29 g, 0.199 mole) was dissolved in 100 ml of water and added to solution of 50 g silver triflate (0.195 mol) in 200 g water with stirring. The silver chloride precipitate was removed by filtration, and the solids were washed with 100 ml of deionized water. The filtrate was concentrated on a rotary evaporator and further dried at 75° C. overnight to provide 47.5 g of a light green oil that was characterized by $^1$H and $^{19}$F NMR. The product was also characterized for melting point ($T_m$) according to Test Method I and for onset of thermal decomposition ($T_d$) according to Test Method II. Results are shown in Table 4.

Compound 14

Synthesis of 1,3-Ethylmethylimidazolium Tetrafluoroborate, $CH_3$-cyc-($N^+C_2H_2NCH$)$CH_2CH_3BF_4^-$ Separate solutions of 49.6 g AgBF4 (194.68 g/mol, 0.255 mol) in 200 ml distilled water, and 37.35 g 1,3-Ethylmethylimidazolium chloride (146.62 g/mol, 0.255 mol) in 200 ml distilled water were prepared. The two solutions were mixed together, instantly forming a white precipitate. The solution was allowed to settle, followed by filtration through a D-frit. The filtrate was concentrated, but not to dryness and allowed to stand at room temperature overnight. The next morning a black precipitate was observed to have fallen out of solution. The solution was passed through filter paper to removed the small amount of solid. The remaining water was removed by reduced pressure distillation on a rotary evaporator. The remaining oil was dissolved in 200 ml acetonitrile. More insoluble black precipitate was formed and was filtered out of the solution. The yellow filtrate was concentrated on the rotary evaporator, and the resulting oil was dried overnight under vacuum at 75 C. The isolated weight of product was 40 g (79% yield). The product was also characterized for melting point ($T_m$) according to Test Method I and for onset of thermal decomposition ($T_d$) according to Test Method II. Results are shown in Table 4.

Compound 15

Synthesis of 1,3-Ethylmethylimidazolium Hexafluorophosphate, $CH_3$-cyc-($N^+C_2H_2NCH$)$CH_2CH_3PF_6^-$ A solution of 500 ml acetonitrile and 73.1 g 1,3-Ethylmethylimidazolium chloride (146.6 g/mol, 0.498 mol) was prepared in a 1 L flask. Another solution of 250 ml acetonitrile and 81.1 g $NH_4PF_6$ (163 g/mol, 0.498 mol) was similarly prepared and added to the former solution. A white precipitate instantly formed on mixing of the two solutions. The flask was chilled to near 0° C. for 1 hour followed by filtration through high purity Celite using a D-frit. The solvent was removed by reduced pressure distillation on a rotary evaporator. The ionic salt was dried under vacuum at 75 C. overnight. The isolated weight of product was 114 g (89% yield). The product was also characterized for melting point ($T_m$) according to Test Method I and for onset of thermal decomposition ($T_d$) according to Test Method II. Results are shown in Table 4.

EXAMPLES

Example 1

Synthesis of Octyldimethyl-2-hydroxyethylammonium bis(trifluoromethylsulfonyl)imide, $C_8H_{17}N^+(CH_3)_2CH_2CH_2OH^-N(SO_2CF_3)_2$ A 19.2 g sample of $C_8H_{17}N^+(CH_3)_2CH_2CH_2OH^-OSO_2CH_3$ (HTS 905A) was combined with 15.7 g LiN($SO_2CF_3)_2$ (HQ-115) in 120 mL of water. After agitating the mixture, a clear, nonmiscible oil separated as a lower liquid phase. The mixture was transferred to a separatory funnel and 125 mL of methylene chloride was added. The mixture was shaken vigorously and allowed to phase separate. The lower organic phase was isolated and washed with two additional 125 mL portions of water. The washed methylene chloride phase was isolated, dried over anhydrous aluminum oxide beads, filtered by suction and vacuum stripped at 30–100° C., 20–10$^{-3}$ Torr to remove all volatiles. A colorless oil (22.6 g, 85% yield) of high purity was obtained, which was identified as the title compound by $^1$H, $^{13}$C and $^{19}$F NMR. The product was also characterized for melting point ($T_m$) according to Test Method I and for onset of thermal decomposition ($T_d$) according to Test Method II. Results are shown in Table 1.

Example 2

Synthesis of Octyldimethyl-2-hydroxyethylammonium perfluorobutanesulfonate, $C_8H_{17}N^+(CH_3)_2CH_2CH_2OH^-OSO_2C_4F_9$ A 118.5 g (0.399 mol) sample of $C_8H_{17}N^+(CH_3)_2CH_2CH_2OH^-OSO_2CH_3$ (HTS 905A) was dissolved in about 250 ml of water and 123.9 g (0.399 mol) of $LiOSO_2C_4F_9$ (prepared by hydrolysis of $C_4F_9SO_2F$ [PBSF] with LiOH) was dissolved in about 100 ml of water. The two solutions were added to a separatory funnel and the mixture was shaken vigorously. Next 200 ml of methylene chloride was added to the funnel and the contents were shaken and allowed to phase separate. The lower methylene chloride layer was washed twice with about 200 ml of water and concentrated on a rotary evaporator at about 85° C. for about 45 min to yield an off-white solid, which was characterized by $^1$H and $^{13}$C nuclear magnetic resonance spectroscopy (NMR). The product was also characterized for melting point ($T_m$) according to Test Method I and for onset of thermal decomposition ($T_d$) according to Test Method II. Results are shown in Table 1.

Example 3

Synthesis of Octyldimethyl-2-hydroxyethylammonium trifluoromethanesulfonate, $C_8H_{17}N^+(CH_3)_2CH_2CH_2OH^-OSO_2CF_3$ Into 30 g of acetonitrile in a 125 ml Erlenmeyer flask was dissolved with heating 29.7 g (0.1 mole) HTS-905A ($C_8H_{17}N^+(CH_3)_2CH_2CH_2OH^-O_3SCH_3$) and then cooled in an ice bath for 10 minutes. In another 125 ml Erlenmeyer flask was dissolved with heating 15.6 g (0.1 mole) lithium triflate into 30 ml of acetonitrile. Next the lithium triflate solution was added over about 1 min to the stirred, cooled HTS-905A solution with generation of a white precipitate. About 2 ml of acetonitrile was used to rinse the Erlenmeyer flask that held the lithium triflate solution, and this was also added to the HTS-905A solution. The reaction mixture was allowed to stir for about 10 minutes and was then vacuum filtered through a pad of Celite on a 125 ml Buchner funnel with a C porosity frit. The reaction flask and Celite pad were washed with an additional 30 g of ice-cold acetonitrile. The filtrate was concentrated on a rotary evaporator at about 50 mm Hg with a bath temperature of about 85° C. for about 45 min to yield 24.5 g of a clear solid, which was characterize by $^1$H and $^{13}$C NMR. The product was also characterized for melting point ($T_m$) according to Test Method I and for onset of thermal decomposition ($T_d$) according to Test Method II. Results are shown in Table 1.

Example 4

Synthesis of Octyldimethyl-2-hydroxyethylammonium tris(trifluoromethanesulfonyl)methide, $C_8H_{17}N^+(CH_3)_2CH_2CH_2OH^-C(SO_2CF_3)_3$ A 20.0 g sample of $C_8H_{17}N^+(CH_3)_2CH_2CH_2OH^-OSO_2CH_3$ (HTS 905) was combined with 29.6 g $HC(SO_2CF_3)_3$ (prepared as described in Example 1 of U.S. Pat. No. 5,554,664) in 250 mL of water. After agitating the mixture, a clear, viscous, pale yellow, nonmiscible oil separated as a lower liquid phase. The mixture was transferred to a separatory funnel, combined with 300 mL of methylene chloride, and worked up according to the procedure in Example 1. After vacuum stripping all volatiles, a total of 29.0 g (79% yield) of pale yellow oil was obtained, which was identified as the title compound by $^1H$ and $^{19}F$ NMR. Estimated purity from the NMR analysis was greater than 90 weight %, the major impurity being the corresponding $^-C(SO_2CF_3)_2(SO_2F)$ salt. The product was also characterized for melting point ($T_m$) according to Test Method I and for onset of thermal decomposition ($T_d$) according to Test Method II. Results are shown in Table 1.

Example 5

Synthesis of Trimethyl-2-acetoxyethylammonium bis(trifluoromethylsulfonyl)imide, $(CH_3)_3N^+CH_2CH_2OC(O)CH3^-N(SO_2CF_3)_2$ Acetylcholine chloride (98 g, Research Organics, Cleveland, Ohio) and $LiN(SO_2CF_3)_2$ (HQ-115) (165.8 g) were combined in 600 mL of water with magnetic stirring. A viscous, nonmiscible oil separated as a lower liquid phase. The reaction mixture was worked up essentially as described in Example 1, except that the ionic liquid product was not completely miscible with methylene chloride, forming 3 separate liquid phases in the presence of water. The lower ionic liquid phase and the middle $CH_2Cl_2$ phase were both carried through the workup. After vacuum stripping all volatiles, a total of 179.1 g (77% yield) of colorless oil of high purity was obtained, which was identified as the title compound by $^1H$, $^{13}C$ and $^{19}F$ NMR. The product was also characterized for melting point ($T_m$) according to Test Method I and for onset of thermal decomposition ($T_d$) according to Test Method II. Results are shown in Table 1.

Example 6

Synthesis of Trimethyl-2-hydroxyethylammonium bis(perfluorobutanesulfonyl)imide, $(CH_3)_3N^+CH_2CH_2OH^-N(SO_2C_4F_9)_2$ Choline chloride (37.34 g, Aldrich) and $LiN(SO_2C_4F_9)_2$ (142.7 g, prepared according to Example 4 in U.S. Pat. No. 5,874,616) were combined in 400 mL of water with magnetic stirring. A viscous, nonmiscible oil separated as a lower liquid phase. The mixture was transferred to a separatory funnel and 110 mL of diethyl ether were added. The mixture was shaken vigorously and allowed to phase separate. The lower organic phase was isolated and washed with two additional 400 mL portions of water. The washed ether phase was isolated and vacuum stripped at 30–100° C., 20–10$^{-3}$ Torr to remove all volatiles. A colorless oil (155.3 g, 93% yield) of high purity was obtained, which was identified as the title compound by $^1H$, $^{13}C$ and $^{19}F$ NMR. The product was also characterized for melting point ($T_m$) according to Test Method I and for onset of thermal decomposition ($T_d$) according to Test Method II. Results are shown in Table 1.

Comparative Example C1

Larostat™ HTS 905A, octyldimethylhydroxyethylammonium methanesulfonate $(C_8H_{17}N^+(CH_3)_2C_2H_4OH^-OSO_2CH_3)$ was also characterized for melting point ($T_m$) according to Test Method I and for onset of thermal decomposition ($T_d$) according to Test Method II. Results are shown in Table 1.

TABLE 1

Melting Point ($T_m$) and Onset of Thermal Decomposition ($T_d$) Values Found for Compounds Synthesized in Examples 1–6.

| Example | Compound | $T_m$ (° C.) | $T_d$ (° C.) |
|---|---|---|---|
| 1 | $C_8H_{17}N^+(CH_3)_2CH_2CH_2OH^-N(SO_2CF_3)_2$ | None detected | 409 |
| 2 | $C_8H_{17}N^+(CH_3)_2CH_2CH_2OH^-OSO_2C_4F_9$ | 147 | 374 |
| 3 | $C_8H_{17}N^+(CH_3)_2CH_2CH_2OH^-OSO_2CF_3$ | −26 | 370 |
| 4 | $C_8H_{17}N^+(CH_3)_2CH_2CH_2OH^-C(SO_2CF_3)_3$ | None detected | 387 |
| 5 | $(CH_3)_3N^+CH_2CH_2OC(O)CH3^-N(SO_2CF_3)_2$ | 24 | 361 |
| 6 | $(CH_3)_3N^+CH_2CH_2OH^-N(SO_2C_4F_9)_2$ | 32 | 402 |
| C1 | $C_8H_{17}N^+(CH_3)_2C_2H_4OH^-OSO_2CH_3$ | About 30 | 289 |

The results in Table 1 show that among antistat having the same cation, those containing weakly coordinating fluoroorganic anions (Examples 1–4) exhibit greatly increased thermal stability over that of Comparative Example C1 having a more strongly coordinating anion. All examples of the invention show good thermal stability.

Example 7

Synthesis of Trimethyl-3-perfluorooctylsulfonamidopropylammonium bis(trifluoromethanesulfonyl)imide, $C_8F_{17}SO_2NH(CH_2)_3N^+(CH_3)_3^-N(SO_2CF_3)_2$ In a 4.0 L separatory funnel was combined 800 mL water, 400 g of 50% FC-754 $(C_8F_{17}SO_2NH(CH_2)_3N^+(CH_3)_3\ Cl^-)$, 90.4 g $Li^{+-}N(SO_2CF_3)_2$ (HQ-115) and 700 mL methyl-t-butyl ether (MTBE). The mixture was agitated and the upper and lower liquid phases allowed to separate overnight. The two liquid phases were isolated and the water phase was extracted with a fresh 500 mL portion of MTBE. The ether phases were combined and extracted with a fresh 700 mL portion of water. The isolated ether phase was dried over molecular sieves, filtered through paper, and the solvent was evaporated to dryness in a vacuum oven at 95° C. and 300–400 Torr providing 267.3 g of the title compound (96% Yield). The solid product was characterized for melting point ($T_m$) according to Test Method I and for onset of thermal decomposition ($T_d$) according to Test Method II. Results are shown in Table 2.

Comparative Example C2

Aliquat™ 336, methyltrioctylammonium chloride $((C_8H_{17})_3N^+(CH_3)Cl^-)$ was liquid at room temperature and was also characterized for onset of thermal decomposition ($T_d$) according to Test Method II. Results are shown in Table 2. Because of its low thermal decomposition temperature, this compound could not be incorporated into melt-blown fibers.

TABLE 2

Melting Point ($T_m$) and Onset of Thermal
Decomposition ($T_d$) Values Found for
Comparative Example C2 and Compounds 1–6.

| Example or Compound No. | Compound | $T_m$ (° C.) | $T_d$ (° C.) |
|---|---|---|---|
| Compound 1 | $Et_3N^+H\ ^-N(SO_2C_2F_5)_2$ | −10 | 351 |
| Compound 2 | $CF_3SO_3^-\ ^+NEt_4$ | 133 | 371 |
| Compound 3 | $(CF_3SO_2)_2N^-\ ^+NEt_4$ | 8 | 426 |
| Compound 4 | $(CH_3)_4N^+\ ^-C(SO_2CF_3)_3$ | 148 | 422 |
| Compound 5 | $(C_4H_9)_4N^+\ ^-N(SO_2CF_3)_2$ | 93 | 401 |
| 7 | $C_8F_{17}SO_2NH(CH_2)_3N^+(CH_3)_3\ ^-N(SO_2CF_3)_2$ | 121 | 365 |
| C2 | $(C_8H_{17})_3N^+(CH_3)\ Cl^-$ | <28 | 177 |

The data in Table 2 shows that Example 7 and the compounds useful in the invention having the weakly coordinating fluoroorganic anions show much greater thermal stability than Comparative Example C2 having the more strongly coordinating chloride anion.

Comparative Example C3

Synthesis of 1-Hexadecylpyridinium p-Toluenesulfonate, $n\text{-}C_{16}H_{33}\text{-}cyc\text{-}N^+C_5H_5^-\ OSO_2C_6H_4\text{-}p\text{-}CH_3$ The title compound was prepared according to the method of Example 14, except that 100 g of cetylpyridinium chloride monohydrate was reacted with 55 g $Na^{+-}OSO_2C_6H_4$-p-$CH_3$ (Sigma-Aldrich, Milwaukee, Wis.). The product was also characterized for melting point ($T_m$) according to Test Method I and for onset of thermal decomposition ($T_d$) according to Test Method II. Results are shown in Table 3.

TABLE 3

Melting Point ($T_m$) and Onset of Thermal
Decomposition ($T_d$) Values Found for
Comparative Example C2 and Compounds 7–11.

| Example or Compound No. | Compound | $T_m$ (° C.) | $T_d$ (° C.) |
|---|---|---|---|
| Compound 6 | $n\text{-}C_{16}H_{33}\text{-}cyc\text{-}N^+C_5H_5\ ^-N(SO_2C_2F_5)_2$ | 34 | 396 |
| Compound 7 | $n\text{-}C_{16}H_{33}\text{-}cyc\text{-}N^+C_5H_5\ ^-OSO_2C_4F_9$ | 95 | 357 |
| Compound 8 | $n\text{-}C_{16}H_{33}\text{-}cyc\text{-}N^+C_5H_5\ ^-OSO_2C_8F_{17}$ | 93 | 364 |
| Compound 9 | $n\text{-}C_4H_9\text{-}cyc\text{-}N^+C_5H_5\ ^-N(SO_2CF_3)_2$ | 33 | 430 |
| Compound 10 | $n\text{-}C_4H_9\text{-}cyc\text{-}N^+C_5H_5\ ^-OSO_2C_4F_9$ | 63 | 391 |
| C3 | $n\text{-}C_{16}H_{33}\text{-}cyc\text{-}N^+C_5H_5\ ^-OSO_2C_6H_4\text{-}p\text{-}CH_3$ | 138 | 310 |

Table 3 shows that the pyridinium compounds useful in the invention having the weakly coordinating fluoroorganic anions have greater thermal stability than Comparative Example C3 having the more strongly coordinating anion.

TABLE 4

Melting point ($T_m$) and Onset of Thermal
Decomposition ($T_d$) Values Found for Compounds 11–15.

| Compound No. | Compound | $T_m$ (° C.) | $T_d$ (° C.) |
|---|---|---|---|
| 11 | $CH_3\text{-}cyc\text{-}(N^+C_2H_2NCH)CH_2CH_3\ ^-N(SO_2CF_3)_2$ | −18 | 450 |
| 12 | $CH_3\text{-}cyc\text{-}(N^+C_2H_2NCH)CH_2CH_3\ ^-OSO_2C_4F_9$ | 18 | 410 |
| 13 | $CH_3\text{-}cyc\text{-}(N^+C_2H_2NCH)CH_2CH_3\ ^-OSO_2CF_3$ | −16 | 429 |
| 14 | $CH_3\text{-}cyc\text{-}(N^+C_2H_2NCH)CH_2CH_3\ BF_4^-$ | 7 | 420 |

TABLE 4-continued

Melting point ($T_m$) and Onset of Thermal
Decomposition ($T_d$) Values Found for Compounds 11–15.

| Compound No. | Compound | $T_m$ (° C.) | $T_d$ (° C.) |
|---|---|---|---|
| 15 | $CH_3\text{-}cyc\text{-}(N^+C_2H_2NCH)CH_2CH_3\ PF_6^-$ | 70 | 490 |

The data of Table 4 show that the imidazolium compounds useful in the invention having the weakly coordinating fluoroorganic anions all have excellent thermal stability, with $T_d$ all greater than 400° C.

Examples 23–46 and Comparative Examples C4–C7

The compounds of Examples 1–7, Compounds 1–15, and Comparative Examples C1–C3 were incorporated into polypropylene melt blown fibers, which were processed into nonwoven fabrics according to the melt-blown extrusion procedure described in U.S. Pat. No. 5,300,357, column 10, which is herein incorporated by reference. For comparison, polypropylene melt blown fibers without these compounds were processed into nonwoven fabrics as well. The extruder used was a Brabender 42 mm conical twin screw extruder, with maximum extrusion temperature of 270–280° C. and distance to the collector of 12 inches (30 cm).

The compound and Escorene™ PP3505 polypropylene were mixed by blending in a paperboard container using a mixer head affixed to a hand drill for about one minute until a visually homogeneous mixture is obtained. The compound was dispersed in the molten polypropylene by mixing in the melt extrusion apparatus just prior to melt blowing. Except as noted, the weight percent of the compound in the polypropylene was about 1%.

The process condition for each mixture was the same, including the melt blowing die construction used to blow the microfiber web, the basis weight of the web (50±5 g/m²) and the diameter of the microfibers (5–18 micrometers). Unless otherwise stated, the extrusion temperature was 270–280° C., the primary air temperature was 270° C., the pressure was 124 kPa (18 psi), with a 0.076 cm air gap width, and the polymer throughput rate was about 180 g/hr/cm.

The resulting melt blown polypropylene fabric made with and without the compounds of Examples 1–7, compounds 1–15, and Comparative Examples C1–C3 were evaluated for antistatic performance using Test Method III—Static Charge Dissipation Test. The results are shown in Table 5.

Table 5. Static Charge Dissipation of Escorene™ PP3505 Polypropylene With and Without Ionic Antistat Compounds at 10, 25, and 50 Percent Relative Humidity (RH).

| Example No. | Antistat Compound | Aver. Induced Electrostatic Charge (Volts) | | | Aver. Static Decay Rate (sec) | | |
|---|---|---|---|---|---|---|---|
| | | 10% RH | 25% RH | 50% RH | 10% RH | 25% RH | 50% RH |
| C4 | None | 4270 | 5000+ 1750 5000+ | 5000+ 1750 5000 | 60+ | 60 >10 >10 | 60 >10 >10 |
| C5 | $C_8H_{17}N^+(CH_3)_2C_2H_4OH^-OSO_2CH_3$ | 5000+ | 3393 | 5000+ | 0.86 | 0.14 | 0.03 |
| 23 | $C_8H_{17}N^+(CH_3)_2C_2H_4OH\ ^-N(SO_2CF_3)_2$ | 5000+ | 5000+ | 5000+ | 0.14 | 0.19 | 0.63 |
| 24 | $C_8H_{17}N^+(CH_3)_2C_2H_4OH\ ^-N(SO_2CF_3)_2$ (0.5% by wt.) | Not run | 5000 | 5000 | Not run | >10 | 0.95 |
| 25 | $C_8H_{17}N^+(CH_3)_2C_2H_4OH^-OSO_2C_4F_9$ | 5000 | 5000 | 5000 | 0.90 | 0.02 | 0.02 |
| 26 | $C_8H_{17}N^+(CH_3)_2CH_2CH_2OH^-OSO_2CF_3$ | 5000 | 5000 | 5000 | 4.17 | 0.09 | 0.03 |
| 27 | $C_8H_{17}N^+(CH_3)_2CH_2CH_2OH\ ^-C(SO_2CF_3)_3$ | Not run | Not run | 5000 | Not run | Not run | >10 |
| 28 | $CH_3COOCH_2CH_2N^+(CH_3)_3\ ^-N(SO_2CF_3)_2$ | Not run | 5000+ | 5000+ | Not run | >60 | >60 |
| 29 | $HOCH_2CH_2N^+(CH_3)_3\ ^-N(O_2SC_4F_9)_2$ | Not run | 4850 | 5000+ | Not run | 56 | >60 |
| C6 | $(C_8H_{17})_3N^+(CH_3)\ Cl^-$ | NR* | NR* | NR* | NR* | NR* | NR* |
| 30 | $Et_3NH+\ ^-N(SO_2C_2F_5)_2$ | 5000 | 5000 | 5000 | 0.03 | 0.03 | 0.02 |
| 31 | $CF_3SO_3^-\ ^+NEt_4$ | Not run | Not run | 5000 | Not run | Not run | >10 |
| 32 | $CF_3SO_3^-\ ^+NEt_4$ (2% by wt.) | 5000 | 5000 | 5000 | 0.13 | 0.38 | 0.51 |
| 33 | $(CF_3SO_2)_2N^-\ ^+NEt_4$ | Not run | Not run | 5000 | Not run | Not run | >10 |
| 34 | $(CH_3)_4N^+\ ^-C(SO_2CF_3)_3$ | Not run | 4400 | 3350 | Not run | 60 | 60 |
| 35 | $Bu_4N^+\ ^-N(SO_2CF_3)_2$ | Not run | 3700 | 3600 | Not run | 60 | 60 |
| 36 | $C_8F_{17}SO_2NH(CH_2)_3N^+(CH_3)_3\ ^-N(SO_2CF_3)_2$ | Not run | 2200 | 1600 | Not run | 0.01 | 0.01 |
| C7 | $n$-$C_{16}H_{33}N^+C_5H_5^-\ OSO_2C_6H_4$-$p$-$CH_3$ | Not run | 4900 | 4900 | Not run | 52 | 52 |
| 37 | $n$-$C_{16}H_{33}N^+C_5H_5^-\ N(SO_2C_2F_5)_2$ | 4800 | 4700 | 5000+ | 34 | 8.9 | 45 |
| 38 | $n$-$C_{16}H_{33}N^+C_5H_5^-\ OSO_2C_4F_9$ | Not run | 5000+ | 5000+ | Not run | 56 | 1.01 |
| 39 | $n$-$C_{16}H_{33}N^+C_5H_5^-\ OSO_2C_8F_{17}$ | Not run | 3600 | 5000+ | Not run | >60 | 3.98 |
| 40 | $n$-$C_4H_9N^+C_5H_5^-\ N(O_2SCF_3)_2$ | Not run | 5000+ | 4300 | Not run | 49 | 0.06 |
| 41 | $n$-$C_4H_9N^+C_5H_5\ ^-O_3SC_4F_9$ | Not run | 5000+ | 5000+ | Not run | >60 | 0.46 |
| 42 | $CH_3$-cyc-$(N^+C_2H_2NCH)CH_2CH_3\ ^-N(SO_2CF_3)_2$ | 4125 | 3900 | 3350 | 60+ | 0.01 | 53 |
| 43 | $CH_3$-cyc-$(N^+C_2H_2NCH)CH_2CH_3\ ^-OSO_2C_4F_9$ | 5000+ | 5000+ | 5000+ | 0.02 | 20 | 0.03 |
| 44 | $CH_3$-cyc-$(N^+C_2H_2NCH)CH_2CH_3\ ^-OSO_2CF_3$ | Not run | 2500 | 2500 | Not run | >10 | 0.01 |
| 45 | $CH_3$-cyc-$(N^+C_2H_2NCH)CH_2CH_3\ BF_4^-$ | 4500 | 4950 | 4250 | >60 | >60 | >60 |
| 46 | $CH_3$-cyc-$(N^+C_2H_2NCH)CH_2CH_3\ PF_6^-$ | Not run | 3800 | 4450 | Not run | >60 | >60 |

*Could not be incorporated into fabric, because of thermal instability.

The data in Table 5 show several examples that show exceptional static charge dissipation performance, that is, fabrics that accepted the full 5000 Volt charge, and which had dissipation times under 1 second even at relative humidities of 25 percent or even 10 percent. These include Examples 23, 25, 26, 30, 32, 36, 42, and 43. All of these examples were made using antistat compounds that had thermal decomposition temperatures of 370° C. or higher. Comparative Example C5 showed exceptional static charge dissipation performance, but has a thermal decompositon temperature of 289° C. Comparative Example C6 with a thermal decomposition temperature of 177° C. was insufficiently stable for the melt-blown extrusion process. Examples 23 and 24 as well as 31 and 32 show the effect of antistat compound concentration upon static charge dissipation performance, with higher concentrations (Examples 23 and 32) showing superior performance over the lower concentrations (Examples 24 and 31). Many of the examples in Table 5 that did not show good static charge dissipation performance at the 25 percent and 10 percent relative humidity levels, did show static dissipation times of less than 5 seconds at 50 percent relative humidity (Examples 38–41, and 44). Examples in Table 5 that did not show good static charge dissipation performance at any relative humidity at the 1% concentration may demonstrate such performance at higher levels, and/or in other polymers, and/or upon annealing.

Example 47 and Comparative Example C8

The compound of Example 1 was incorporated into polyethylene terephthalate 65–1000 melt blown fibers, which were processed into a nonwoven fabric according to the melt-blown extrusion procedure described in U.S. Pat. No. 5,300,357, column 10, which is herein incorporated by reference. For comparison, polyethylene terephthalate 65–1000 melt blown fibers without the compound were processed into a nonwoven fabric as well. The extruder used was a Brabender 42 mm conical twin screw extruder, with maximum extrusion temperature of 280° C. and distance to the collector of 12 inches (30 cm).

The compound and polyethylene terephthalate 65–1000 were mixed by blending in a paperboard container using a mixer head affixed to a hand drill for about one minute until a visually homogeneous mixture is obtained. The compound was dispersed in the molten polyethylene terephthalate by mixing in the melt extrusion apparatus just prior to melt blowing. The weight percent of the compound in the urethane was 2%.

The process condition for each mixture was the same, including the melt blowing die construction used to blow the microfiber web, the basis weight of the web (50±5 gm$^2$) and the diameter of the microfibers (5–18 micrometers). The extrusion temperature was 280° C., the primary air temperature was 270° C., the pressure was 124 kPa (18 psi), with a 0.076 cm air gap width, and the polymer throughput rate was about 180 g/hr/cm.

The resulting melt blown polyethylene terephthalate 65–1000 fabric made with and without the compound of Example 23 was evaluated for antistatic performance using Test Method III—Static Charge Dissipation Test. The results are shown in Table 6.

Example 48 and Comparative Example C9

The compound of Example 1 was incorporated into MORTHANE™ PS440-200 urethane melt blown fibers, which were processed into a nonwoven fabric as described in Example 47, except that the extrusion temperature was 230° C. For comparison, MORTHANE™ PS440-200 urethane melt blown fibers without the compound were processed into a nonwoven fabric as well. The fabrics were tested for antistatic performance using Test Method III—Static Charge Dissipation Test. The results are shown in Table 7.

TABLE 6

Static Charge Dissipation in Melt Blown Polyethylene Terephthalate 65-1000 Fabric With and Without Octyldimethyl-2-hydroxyethylammonium bis(trifluoromethylsulfonyl)imide.

| Example No. | Antistat Compound | Aver. Induced Electrostatic Charge (Volts) | | | Aver. Static Decay Rate (sec) | | |
|---|---|---|---|---|---|---|---|
| | | 10% RH | 25% RH | 50% RH | 10% RH | 25% RH | 50% RH |
| C8 | None | Not run | 3000 | 3100 | Not run | >60 | >60 |
| 47 | C$_8$H$_{17}$N$^+$(CH$_3$)$_2$C$_2$H$_4$OH $^-$N(SO$_2$CF$_3$)$_2$ (2%) | Not run | 5000 | 5000 | Not run | 0.86 | 3.6 |

The data in Table 6 shows good static charge dissipation of Example 47 compared with the control polyester fabric (Comparative Example C8).

TABLE 7

Static Charge Dissipation in Melt Blown
MORTHANE ® PS440-200 Urethane Fabric With and Without
Octyldimethyl-2-hydroxyethylammonium
bis(trifluoromethylsulfonyl)imide.

| Example | | Aver. Induced Electrostatic Charge (Volts | | | Aver. Static Decay Rate (sec) | | |
|---|---|---|---|---|---|---|---|
| No. | Antistat Compound | 10% RH | 25% RH | 50% RH | 10% RH | 25% RH | 50% RH |
| C9 | None | Not run | 5000+ | 5000+ | Not run | >10 | >10 |
| 48 | $C_8H_{17}N^+(CH_3)_2C_2H_4OH$ $^-N(SO_2CF_3)_2$ (2%) | Not run | 5000 | 5000 | Not run | 0.03 | 0.06 |

The data in Table 7 shows good static charge dissipation of Example 48 compared with the control polyurethane fabric (Comparative Example C9).

Example 49 and Comparative Example C10

The compound of Example 1 was incorporated into ASPUN™ 6806 polyethylene melt blown fibers, which were processed into a nonwoven fabric as described in Example 47, except that 1 weight percent of the compound of Example 1 was used, and the extrusion temperature was 240° C. For comparison, ASPUN[198] 6806 polyethylene melt blown fibers without the compound were processed into a nonwoven fabric as well. The fabrics were tested for antistatic performance using Test Method III—Static Charge Dissipation Test. The results are shown in Table 8.

TABLE 8

Static Charge Dissipation in ASPUN ® 6806
Polyethylene Melt Blown Fabric With and Without
Octyldimethyl-2-hydroxyethylammonium
bis(trifluoromethylsulfonyl)imide.

| Example | | Aver. Induced Electrostatic Charge (Volts | | | Aver. Static Decay Rate (sec) | | |
|---|---|---|---|---|---|---|---|
| No. | Antistat Compound | 10% RH | 25% RH | 50% RH | 10% RH | 25% RH | 50% RH |
| C10 | None | Not run | 2800 | 3400 | Not run | >60 | >60 |
| 49 | $C_8H_{17}N^+(CH_3)_2C_2H_4OH$ $^-N(SO_2CF_3)_2$ (1%) | Not run | 5000 | 5000 | 0.26 | 0.02 | 0.02 |

The data in Table 8 shows good static charge dissipation of Example 49 compared with the control polyethylene fabric (Comparative Example C10).

Example 50 and Comparative Example C11

This example illustrates the use of an ionic liquid antistatic compound in injection molded polycarbonate. Mobay Makrolon™ LQ-3147 polycarbonate pellets were melt-injection molded using a Morgan-Press™ vertical clamp ram injection-molding machine made by Morgan industries Inc. (Long Beach, Calif.). The molding machine was operated at barrel and nozzle temperatures of 288° C. Molten polycarbonate (with and without ionic liquid antistatic compound) was injected under pressure into a preheated aluminum mold designed to produce a flat 7.62 cm by 7.62 cm square molded part with a thickness of 0.254 cm. Two series of polycarbonate parts were produced, each series comprising three parts made under identical conditions. The first series of parts were made using virgin polycarbonate resin with no additives. The second series was made by premixing the polycarbonate pellets with 1.0 weight % 1,3-ethylmethylimidazolium nonafluorobutanesulfonate (Compound 12) ionic liquid antistat prior to feeding the pellets to the barrel of the ram injection-molding machine. All of the molded parts from each series were subjected to surface resistivity measurements on front and back surfaces at 22° C., 32% relative humidity using an ETS wide range resistance meter in Test Method IV—Surface Resistivity Test. The mean values of the surface resistivities for each series of parts are summarized in Table 9.

TABLE 9

Surface Resistivities of Molded Polycarbonate Sheets
Without and With 1,3-Ethylmethylimidazolium
Nonafluorobutanesulfonate Ionic Liquid
Antistat at 1 Percent by Weight.

| Example | Surface (Front or Back) | Surface Resistivity (ohms/square) |
|---|---|---|
| C11 | FRONT | > 10 E 12 |
| | BACK | > 10 E 12 |
| 50 | FRONT | 2.1 × 10 E 8 |
| | BACK | 6.7 × 10 E 7 |

It is apparent from the data in Table 9 that the addition of 1.0 weight % ionic liquid antistatic compound to the molded polycarbonate resin resulted in a dramatic decrease in the surface resistivity of the final molded part. Such reductions in surface resistivity generally correlate with improved antistatic performance. Furthermore, it was noted that the addition of ionic liquid antistat to the polycarbonate had no noticeable impact on the processability of the molten polycarbonate resin or the quality of the final molded articles.

Example 51 and Comparative Example 12

A polypropylene film containing antistatic compound, octyldimethyl-2-hydroxyethylammonium bis(trifluoromethanesulfonyl)imide (Example 1), was prepared and evaluated for antistatic performance. For comparison, a polypropylene film without the compound was identically prepared and evaluated. Thus, the melt-blown nonwoven fabrics of Example 23 and Comparative Example C4 were pressed into films as follows. About 3.4 g of the folded melt-blown fabric was placed on a steel plate within the perimeter of an 11.2 cm by 17.1 cm by 0.177 mm thick shim and covered with another steel plate. This assembly was then placed on a platen press heated to 200° C. with the platens nearly touching for about 30 seconds to premelt the fabric and allow for escape of air before pressing. Next, the construction was placed under 0.91 metric ton of pressure for about one minute. The assembly was removed from the press and allowed to cool for about 30 seconds between two unheated platens. The formed film was then removed from the shim and steel plates.

The films prepared in this way were subjected to Test Method III—Static Charge Dissipation Test. Results are shown in Table 10.

TABLE 10

Static Charge Dissipation in Escorene ® PP3505 Polypropylene Film With and Without Octyldimethyl-2-hydroxyethylammonium bis(trifluoromethylsulfonyl)imide.

| Example No. | Antistat Compound | Aver. Induced Electrostatic Charge (Volts) | | | Aver. Static Decay Rate (sec) | | |
|---|---|---|---|---|---|---|---|
| | | 10% RH | 25% RH | 50% RH | 10% RH | 25% RH | 50% RH |
| C12 | None | Not run | Not run | 4000 | Not run | Not run | >10 |
| 51 | $C_8H_{17}N^+(CH_3)_2C_2H_4OH$ $^-N(SO_2CF_3)_2$ (1%) | 1750 | 1750 | 1400 | 0.003 | 0.007 | 0 |

The data in Table 10 shows good static charge dissipation of Example 51 compared with the control polypropylene film (Comparative Example C12).

Examples 52 and Comparative Example C13

Polyester film with and without a topical treatment of antistat compound were prepared and evaluated for surface resistivity. A 5 weight percent solids solution of octyldimethyl-2-hydroxyethylammonium bis(trifluoromethylsulfonyl)imide, $C_8H_{17}N^+(CH_3)_2CH_2CH_2OH\ ^-N(SO_2CF_3)_2$ (Example 1), in isopropanol was prepared. About 2 ml of solution was pipetted at the top of a 25.5 cm by 15.5 cm by 0.177 mm thick Mellinex 617 film. The solution was then drawn over the film using a No. 12 wire wound bar. The resulting coating was dried in a forced air oven for 2.5 minutes at 65° C. The surface resistivity of this coated film as well as an uncoated film was determined according to Test Method IV—Surface Resistivity Test. The results are shown in Table 11.

Example 53

Melinex 617 film was coated with antistat compound, octyldimethyl-2-hydroxyethylammonium bis(trifluoromethylsulfonyl)imide, $C_8H_{17}N^+(CH_3)_2CH_2CH_2OH\ ^-N(SO_2CF_3)_2$ (Example 1), without solvent as in Example 52, except that no solvent was used, a No. 3 wire wound bar was used to coat the compound, and the resultant coating was not dried in an oven. The surface resistivity of this coated film was determined as in Example 52, and the results are shown in Table 11.

Various modifications and alterations of this invention will become apparent to those skilled in the art without departing from the scope and spirit of this invention.

What is claimed is:

1. An antistatic composition comprising a melt blend of (a) at least one ionic salt consisting of a nonpolymeric nitrogen onium cation and a weakly coordinating fluoroorganic anion, the conjugate acid of said anion being a superacid; and (b) at least one thermoplastic polymer.

2. The composition of claim 1 wherein said nitrogen onium cation is selected from the group consisting of acyclic, saturated cyclic, and aromatic nitrogen onium cations.

3. The composition of claim 2 wherein said nitrogen onium cation is selected from the group consisting of acyclic and aromatic nitrogen onium cations.

4. The composition of claim 3 wherein said nitrogen onium cation is an aromatic nitrogen onium cation.

5. The composition of claim 2 wherein said acyclic nitrogen onium cations are quaternary or tertiary ammonium ions.

6. The composition of claim 5 wherein said ions have at least two different nitrogen-bonded organic substituents.

7. The composition of claim 5 wherein said ions contain at least one hydroxyl group in at least one nitrogen-bonded organic substituent.

8. The composition of claim 2 wherein said aromatic nitrogen onium cations are selected from the group consisting of

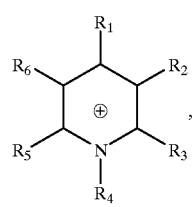

Pyridinium

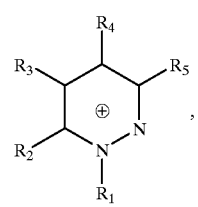

Pyridazinium

-continued

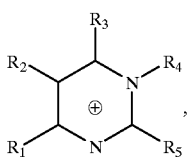
Pyrimidinium

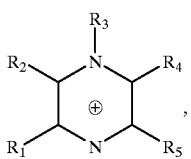
Pyrazinium

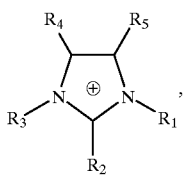
Imidazolium

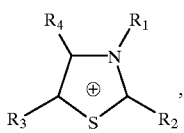
Pyrazolium

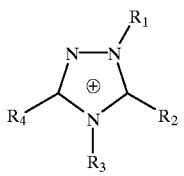
Thiazolium

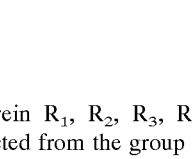
Oxazolium

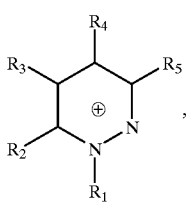
Triazolium wherein $R_1$, $R_2$, $R_3$, $R_4$, $R_5$, and $R_6$ are independently selected from the group consisting of H, F, alkyl groups of from 1 to about 4 carbon atoms, two said alkyl groups joined together to form a unitary alkylene radical of from 2 to 4 carbon atoms forming a ring structure converging on N, and phenyl groups; and wherein said alkyl groups, said alkylene radicals, and said phenyl groups can be substituted with one or more electron withdrawing groups.

9. An antistatic composition comprising a melt blend of (a) at least one ionic salt consisting of (i) a nonpolymeric acyclic, saturated cyclic, or aromatic nitrogen onium cation and (ii) a weakly coordinating fluoroorganic anion, said aromatic nitrogen onium cation being selected from the group consisting of

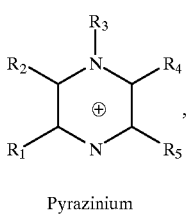
Pyridazinium

Pyrazinium

-continued

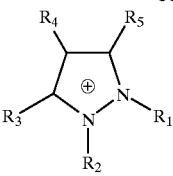
Pyrazolium

Thiazolium

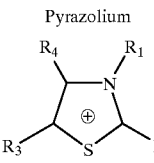
Oxazolium and

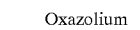

Triazolium wherein $R_1$, $R_2$, $R_3$, $R_4$, and $R_5$ are independently selected from the group consisting of H, F, alkyl groups of from 1 to about 4 carbon atoms, two said alkyl groups joined together to form a unitary alkylene radical of from 2 to 4 carbon atoms forming a ring structure converging on N, and phenyl groups; and wherein said alkyl groups, said alkylene radicals, and said phenyl groups can be substituted with one or more electron withdrawing groups; and the conjugate acid of said anion being a superacid; and (b) at least one thermoplastic polymer.

10. The composition of claim 1 wherein said weakly coordinating fluoroorganic anion is perfluorinated.

11. The composition of claim 10 wherein said anion is selected from the group consisting of perfluoroalkanesulfonates, cyanoperfluoroalkanesulfonylamides, bis(cyano) perfluoroalkanesulfonylmethides, bis (perfluoroalkanesulfonyl)imides, bis (perfluoroalkanesulfonyl)methides, and tris (perfluoroalkanesulfonyl)methides.

12. The composition of claim 11 wherein said anion is selected from the group consisting of perfluoroalkanesulfonates, bis(perfluoroalkanesulfonyl) imides, and tris(perfluoroalkanesulfonyl)methides.

13. The composition of claim 12 wherein said anion is selected from the group consisting of bis (perfluoroalkanesulfonyl)imides and tris (perfluoroalkanesulfonyl)methides.

14. The composition of claim 13 wherein said anion is a bis(perfluoroalkanesulfonyl)imide.

15. The composition of claim 1 wherein the Hammett acidity function, $H_o$, of said conjugate acid is less than about −10.

16. The composition of claim 1 wherein said ionic salt is thermally stable at about 325° C.

17. The composition of claim 1 wherein said ionic salt has a melting point below about 150° C.

18. The composition of claim 1 wherein said ionic salt has a melting point below about 25° C.

19. The composition of claim 1 wherein said ionic salt is hydrophobic.

20. The composition of claim 1 wherein said ionic salt consists of (i) an aromatic nitrogen onium cation selected from the group consisting of

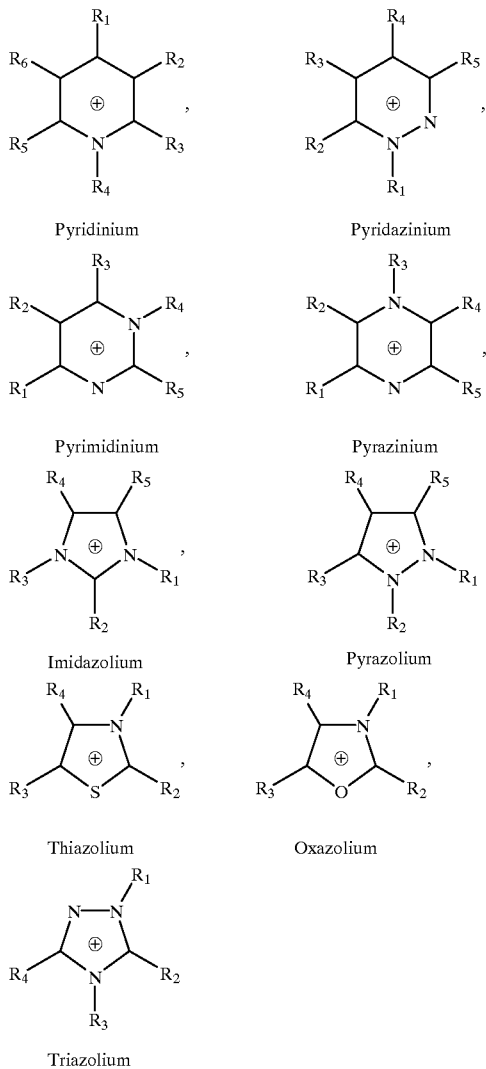

Pyridinium

Pyridazinium

Pyrimidinium

Pyrazinium

Imidazolium

Pyrazolium

Thiazolium

Oxazolium

Triazolium wherein $R_1$, $R_2$, $R_3$, $R_4$, $R_5$, and $R_6$ are independently selected from the group consisting of H, F, alkyl groups of from 1 to about 4 carbon atoms, two said alkyl groups joined together to form a unitary alkylene radical of from 2 to 4 carbon atoms forming a ring structure converging on N, and phenyl groups; and wherein said alkyl groups, said alkylene radicals, and said phenyl groups can be substituted with one or more electron withdrawing groups; and (ii) a weakly coordinating fluoroorganic anion, the conjugate acid of said anion being a superacid, or a weakly coordinating anion selected from the group consisting of $BF_4$—, $PF_6$—, $AsF_6$—, and $SbF_6$—.

21. The composition of claim 1 wherein said ionic salt is selected from the group of compounds represented by the formula

$(R_1)_{4-z}N^+[(CH_2)_qOR_2]_zX^-$ (I)

wherein each $R_1$ is independently selected from the group consisting of alkyl, alicyclic, aryl, alkalicyclic, alkaryl, alicyclicalkyl, aralkyl, aralicyclic, and alicyclicaryl moieties that can contain one or more heteroatoms; each $R_2$ is independently selected from the group consisting of hydrogen and the moieties described above for $R_1$; z is an integer of 1 to 4; q is an integer of 1 to 4; and $X^-$ is said weakly coordinating fluoroorganic anion.

22. The composition of claim 1 wherein said ionic salt is selected from the group consisting of octyldimethyl-2-hydroxyethylammonium bis(trifluoromethylsulfonyl)imide: $[C_8H_{17}N^+(CH_3)_2CH_2CH_2OH^-N(SO_2CF_3)_2]$, octyldimethyl-2-hydroxyethylammonium perfluorobutanesulfonate: $[C_8H_{17}N^+(CH_3)_2CH_2CH_2OH^-OSO_2C_4F_9]$, octyldimethyl-2-hydroxyethylammonium trifluoromethanesulfonate: $[C_8H_{17}N^+(CH_3)_2CH_2CH_2OH^-OSO_2CF_3]$, octyldimethyl-2-hydroxyethylammonium tris (trifluoromethanesulfonyl)methide: $[C_8H_{17}N^+(CH_3)_2CH_2CH_2OH^-C(SO_2CF_3)_3]$, trimethyl-2-acetoxyethylammonium bis(trifluoromethylsulfonyl)imide: $[(CH_3)_3N^+CH_2CH_2OC(O)CH3^-N(SO_2CF_3)_2]$, trimethyl-2-hydroxyethylammonium bis(perfluorobutanesulfonyl)imide: $[(CH_3)_3N^+CH_2CH_2OH^-N(SO_2C_4F_9)_2]$, triethylammonium bis(perfluoroethanesulfonyl)imide: $[Et_3N^+H^-N(SO_2C_2F_5)_2]$, tetraethylammonium trifluoromethanesulfonate: $[CF_3SO_3^{-+}NEt_4]$, tetraethylammonium bis(trifluoromethanesulfonyl)imide: $[(CF_3SO_2)_2N^{-+}NEt_4]$, tetramethylammonium tris (trifluoromethanesulfonyl)methide: $[(CH_3)_4N^+{}^-C(SO_2CF_3)_3]$, tetrabutylammonium bis(trifluoromethanesulfonyl)imide: $[(C_4H_9)_4N^{+-}N(SO_2CF_3)_2]$, trimethyl-3-perfluorooctylsulfonamidopropylammonium bis (trifluoromethanesulfonyl)imide: $[C_8F_{17}SO_2NH(CH_2)_3N^+(CH_3)_3{}^-N(SO_2CF_3)_2]$, 1-hexadecylpyridinium bis (perfluoroethanesulfonyl)imide: $[n-C_{16}H_{33}-cyc-N^+C_5H_5^-N(SO_2C_2F_5)_2]$, 1-hexadecylpyridinium perfluorobutanesulfonate: $[n-C_{16}H_{33}-cyc-N^+C_5H_5^-OSO_2C_4F_9]$, 1-hexadecylpyridinium perfluorooctanesulfonate: $[n-C_{16}H_{33}-cyc-N^+C_5H_5^-OSO_2C_8F_{17}]$, n-butylpyridinium bis(trifluoromethanesulfonyl)imide: $[n-C_4H_9-cyc-N^+C_5H_5^-N(SO_2CF_3)_2]$, n-butylpyridinium perfluorobutanesulfonate: $[n-C_4H_9-cyc-N^+C_5H_5^-OSO_2C_4F_9]$, 1,3-ethylmethylimidazolium bis (trifluoromethanesulfonyl)imide: $[CH_3-cyc-(N^+C_2H_2NCH)CH_2CH_3^-N(SO_2CF_3)_2]$, 1,3-ethylmethylimidazolium nonafluorobutanesulfonate: $[CH_3-cyc-(N^+C_2H_2NCH)CH_2CH_3^-OSO_2C_4F_9]$, 1,3-ethylmethylimidazolium trifluoromethanesulfonate: $[CH_3-cyc-(N^+C_2H_2NCH)CH_2CH_3^-OSO_2CF_3]$, 1,3-ethylmethylimidazolium hexafluorophosphate: $[CH_3-cyc-(N^+C_2H_2NCH)CH_2CH_3PF_6^-]$, 1,3-ethylmethylimidazolium tetrafluoroborate: $[CH_3-cyc-(N^+C_2H_2NCH)CH_2CH_3BF_4^-]$, 1,2-dimethyl-3-propylimidazolium bis (trifluoromethanesulfonyl)imide, 1,2-dimethyl-3-propylimidazolium tris(trifluoromethanesulfonyl)methide, 1,2-dimethyl-3-propylimidazolium trifluoromethanesulfonyl perfluorobutanesulfonylimide, 1-ethyl-3-methylimidazolium cyanotrifluoromethanesulfonylamide, 1-ethyl-3-methylimidazolium bis(cyano) trifluoromethanesulfonylmethide, 1-ethyl-3-methylimidazolium trifluoromethanesulfonylperfluorobutanesulfonylimide, octyldimethyl-2-hydroxyethylammonium trifluoromethylsulfonylperfluorobutanesulfonylimide, 2-hydroxyethytrimethyl trifluoromethylsulfonylperfluorobutanesulfonylimide, 2-methoxyethyltrimethylammonium bis (trifluoromethanesulfonyl)imide octyldimethyl-2-hydroxyethylammonium bis(cyano) trifluoromethanesulfonylmethide, trimethyl-2-acetoxyethylammonium trifluoromethylsulfonylperfluorobutanesulfonylimide, 1-butylpyridinium trifluoromethylsulfonylperfluorobutanesulfonylimide, 2-ethoxyethyltrimethylammonium trifluoromethanesulfonate, 1-butyl-3-methylimidazolium perfluorobutanesulfonate, perfluoro-1-ethyl-3-methylimidazolium bis(trifluoromethanesulfonyl)imide, 1-ethyl-2-methylpyrazolium perfluorobutanesulfonate, 1-butyl-2-ethylpyrazolium trifluoromethanesulfonate, N-ethylthiazolium bis(trifluoromethanesulfonyl)imide, N-ethyloxazolium bis(trifluoromethanesulfonyl)imide, and 1-butylpyrimidinium perfluorobutanesulfonylbis(trifluoromethanesulfonyl)methide, 1,3-ethylmethylimidazolium hexafluorophosphate, 1,3-ethylmethylimidazolium tetrafluoroborate, and mixtures thereof.

23. The composition of claim 22 wherein said ionic salt is selected from the group consisting of octyldimethyl-2-hydroxyethylammonium bis(trifluoromethylsulfonyl)imide: $[C_8H_{17}N^+(CH_3)_2CH_2CH_2OH^-N(SO_2CF_3)_2]$, octyldimethyl-2-hydroxyethylammonium perfluorobutanesulfonate: $[C_8H_{17}N^+(CH_3)_2CH_2CH_2OH^-OSO_2C_4F_9]$, octyldimethyl-2-hydroxyethylammonium trifluoromethanesulfonate: $[C_8H_{17}N^+(CH_3)_2CH_2CH_2OH^-OSO_2CF_3]$, octyldimethyl-2-hydroxyethylammonium tris(trifluoromethanesulfonyl)methide: $[C_8H_{17}N^+(CH_3)_2CH_2CH_2OH^-C(SO_2CF_3)_3]$, trimethyl-2-acetoxyethylammonium bis(trifluoromethylsulfonyl)imide: $[(CH_3)_3N^+CH_2CH_2OC(O)CH3^-N(SO_2CF_3)_2]$, trimethyl-2-hydroxyethylammonium bis(perfluorobutanesulfonyl)imide: $[(CH_3)_3N^+CH_2CH_2OH^-N(SO_2C_4F_9)_2]$, triethylammonium bis(perfluoroethanesulfonyl)imide: $[Et_3N^+H^-N(SO_2C_2F_5)_2]$, tetraethylammonium trifluoromethanesulfonate: $[CF_3SO_3^{-+}NEt_4]$, tetraethylammonium bis(trifluoromethanesulfonyl)imide: $[(CF_3SO_2)_2N^{-+}NEt_4]$, tetramethylammonium tris(trifluoromethanesulfonyl)methide: $[(CH_3)_4N^{+-}C(SO_2CF_3)_3]$, tetrabutylammonium bis(trifluoromethanesulfonyl)imide: $[(C_4H_9)_4N^{+-}N(SO_2CF_3)_2]$, trimethyl-3-perfluorooctylsulfonamidopropylammonium bis(trifluoromethanesulfonyl)imide: $[C_8F_{17}SO_2NH(CH_2)_3N^+(CH_3)_3^-N(SO_2CF_3)_2]$, 1-hexadecylpyridinium bis(perfluoroethanesulfonyl)imide: $[n-C_{16}H_{33}\text{-cyc-}N^+C_5H_5^-N(SO_2C_2F_5)_2]$, 1-hexadecylpyridinium perfluorobutanesulfonate: $[n-C_{16}H_{33}\text{-cyc-}N^+C_5H_5^-OSO_2C_4F_9]$, 1-hexadecylpyridinium perfluorooctanesulfonate: $[n-C_{16}H_{33}\text{-cyc-}N^+C_5H_5^-OSO_2C_8F_{17}]$, n-butylpyridinium bis(trifluoromethanesulfonyl)imide: $[n-C_4H_9\text{-cyc-}N^+C_5H_5^-N(SO_2CF_3)_2]$, n-butylpyridinium perfluorobutanesulfonate: $[n-C_4H_9\text{-cyc-}N^+C_5H_5^-OSO_2C_4F_9]$, 1,3-ethylmethylimidazolium bis(trifluoromethanesulfonyl)imide: $[CH_3\text{-cyc-}(N^+C_2H_2NCH)CH_2CH_3\ ^-N(SO_2CF3)_2]$, 1,3-ethylmethylimidazolium nonafluorobutanesulfonate: $[CH_3\text{-cyc-}(N^{+C}{}_2H_2NCH)CH_2CH_3{}^-OSO_2C_4F_9]$, 1,3-ethylmethylimidazolium trifluoromethanesulfonate: $[CH_3\text{-cyc-}(N^+C_2H_2NCH)CH_2CH_3{}^-OSO_2CF_3]$, 1,3-ethylmethylimidazolium tetrafluoroborate, and mixtures thereof.

24. The composition of claim 23 wherein said ionic salt is selected from the group consisting of 2-hydroxyethylammonium bis(trifluoromethylsulfonyl)imide, octyldimethyl-2-hydroxyethylammonium perfluorobutanesulfonate, octyldimethyl-2-hydroxyethylammonium trifluoromethanesulfonate, triethylammonium bis(perfluoroethanesulfonyl)imide, tetraethylammonium trifluoromethanesulfonate, trimethyl-3-perfluorooctylsulfonamidopropylammonium bis(trifluoromethanesulfonyl)imide, 1,3-ethylmethylimidazolium nonafluorobutanesulfonate, 1,3-ethylmethylimidazolium bis(trifluoromethanesulfonyl)imide, 1,3-ethylmethylimidazolium trifluoromethanesulfonate, and mixtures thereof.

25. The composition of claim 24 wherein said ionic salt is selected from the group consisting of 2-hydroxyethylammonium bis(trifluoromethylsulfonyl)imide, octyldimethyl-2-hydroxyethylammonium trifluoromethanesulfonate, triethylammonium bis(perfluoroethanesulfonyl)imide, 1,3-ethylmethylimidazolium nonafluorobutanesulfonate, 1,3-ethylmethylimidazolium bis(trifluoromethanesulfonyl)imide, 1,3-ethylmethylimidazolium trifluoromethanesulfonate, and mixtures thereof.

26. The composition of claim 1 wherein said thermoplastic polymer is melt processable at temperatures above about 150° C.

27. The composition of claim 1 wherein said thermoplastic polymer is selected from the group consisting of poly(vinyl chloride), polyethylenes, polypropylene, polystyrenes, polyesters, polyamides, polycarbonates, polyoxymethylenes, polyacrylates, polymethacrylates, styrene-acrylonitrile (SAN) and acrylonitrile-butadiene-styrene (ABS) copolymers, high-impact polystyrenes (SB), fluoroplastics, liquid crystalline polymers (LCPs), polyetheretherketone (PEEK), polysulfones, polyimides, polyetherimides, and poly(phenylene oxide)-polystyrene and polycarbonate-ABS blends, and blends thereof.

28. The composition of claim 1 wherein said thermoplastic polymer is selected from the group consisting of polypropylene, polyethylene, polyesters, polyurethanes, polycarbonates, polyetherimides, polyimides, polyetherketones, polysulfones, polystyrenes, ABS copolymers, polyamides, fluoroelastomers, and blends thereof.

29. The composition of claim 1 wherein said thermoplastic polymer is selected from the group consisting of polypropylene, polyethylene, polycarbonates, polyesters, polyurethanes, and blends thereof.

30. The composition of claim 29 wherein said thermoplastic polymer is selected from the group consisting of polypropylene, polycarbonates, polyesters, and blends thereof.

31. An antistatic composition comprising a melt blend of (a) at least one ionic salt consisting of (i) a nonpolymeric nitrogen onium cation (1) selected from those represented by the formula

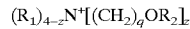

wherein each $R_1$ is independently selected from the group consisting of alkyl, alicyclic, aryl, alkalicyclic, alkaryl, alicyclicalkyl, aralkyl, aralicyclic, and alicyclicaryl moieties that can contain one or more heteroatoms; each $R_2$ is independently selected from the group consisting of hydrogen and the moieties described above for $R_1$; z is an integer of 1 to 4; q is an integer of 1 to 4; or (2) selected from the group consisting of

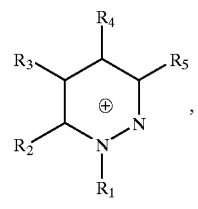

Pyridazinium

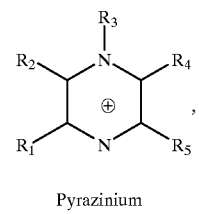

Pyrazinium

-continued

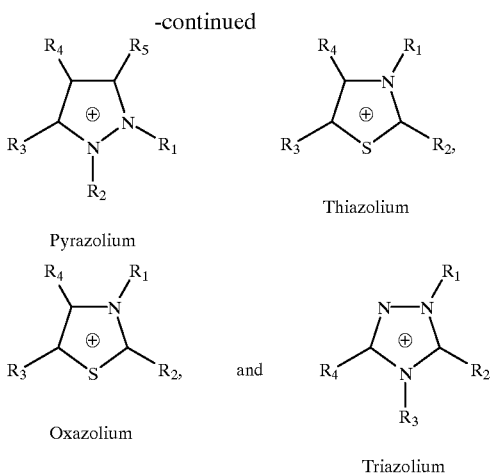

Pyrazolium

Thiazolium

Oxazolium

Triazolium wherein $R_1$, $R_2$, $R_3$, $R_4$, $R_5$, and $R_6$ are independently selected from the group consisting of H, F, alkyl groups of from 1 to about 4 carbon atoms, two said alkyl groups joined together to form a unitary alkylene radical of from 2 to 4 carbon atoms forming a ring structure converging on N, and phenyl groups; and wherein said alkyl groups, said alkylene radicals, and said phenyl groups can be substituted with one or more electron withdrawing groups; and (ii) a weakly coordinating fluoroorganic anion, the conjugate acid of which is a superacid, and that is selected from the group consisting of bis(perfluoroalkanesulfonyl)imides and tris(perfluoroalkanesulfonyl)methides; and (b) at least one thermoplastic polymer.

32. A fiber comprising the composition of claim 1.

33. A fabric comprising the fiber of claim 32.

34. A film comprising the composition of claim 1.

35. A molded or blown article comprising the composition of claim 1.

36. A coating comprising the composition of claim 1.

37. Trimethyl-3-perfluorooctylsulfonamidopropylammonium bis(trifluoromethanesulfonyl)imide.

38. A process for preparing an antistatic composition comprising the steps of (a) combining (i) at least one ionic salt consisting of a nonpolymeric nitrogen onium cation and a weakly coordinating fluoroorganic anion, the conjugate acid of said anion being a superacid, and (ii) at least one thermoplastic polymer; and (b) melt processing the resulting combination.

39. A topical treatment process comprising the step of applying a topical treatment composition to at least a portion of at least one surface of at least one insulating material, said topical treatment composition consisting essentially of at least one ionic salt consisting of (a) a nonpolymeric nitrogen onium cation selected from the group consisting of quaternary ammonium ions, tertiary ammonium ions, saturated cyclic nitrogen onium cations, and aromatic nitrogen onium cations; and (b) a weakly coordinating fluoroorganic anion; the conjugate acid of said anion being a superacid, and said ionic salt being a liquid at the application temperature.

* * * * *

UNITED STATES PATENT AND TRADEMARK OFFICE
CERTIFICATE OF CORRECTION

PATENT NO. : 6,372,829 B1  Page 1 of 1
DATED : April 16, 2002
INVENTOR(S) : Lamanna, William M.

It is certified that error appears in the above-identified patent and that said Letters Patent is hereby corrected as shown below:

Columns 25 and 26,
For Example 36, under both 10% RH columns, delete "Not" and insert in place thereof -- Not run --.

Column 34,
Line 15, delete " 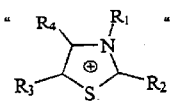 " and insert in place thereof -- 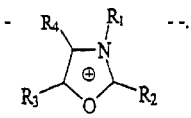 --.

Column 37,
Line 29, delete "[CF$_3$SO$_3$$^{+-}$NEt$_4$]" and insert in place thereof -- [CF$_3$SO$_3$$^-$ $^+$NEt$_4$] --.
Lines 49 and 50, delete "[CH$_3$-$cyc$- (N$^{+C}$$_2$H$_2$NCH) CH$_2$CH$_3$$^-$OSO$_2$C$_4$F$_9$]" and insert thereof -- [CH$_3$-$cyc$- (N$^+$C$_2$H$_2$NCH) CH$_2$CH$_3$$^-$OSO$_2$C$_4$F$_9$] --.

Column 39,
Line 15, delete " 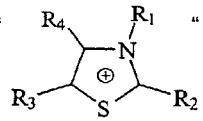 " and insert in place thereof -- 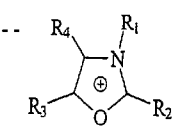 --.

Oxazolium                                    Oxazolium

Signed and Sealed this

Eleventh Day of November, 2003

JAMES E. ROGAN
*Director of the United States Patent and Trademark Office*